(12) United States Patent
Okazaki et al.

(10) Patent No.: US 10,628,154 B2
(45) Date of Patent: Apr. 21, 2020

(54) ARITHMETIC PROCESSING DEVICE AND METHOD OF CONTROLLING ARITHMETIC PROCESSING DEVICE

(71) Applicant: FUJITSU LIMITED, Kwasaki-shi, Kanagawa (JP)

(72) Inventors: Ryohei Okazaki, Kawasaki (JP); Norihito Gomyo, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 263 days.

(21) Appl. No.: 15/075,274

(22) Filed: Mar. 21, 2016

(65) Prior Publication Data

US 2016/0321070 A1     Nov. 3, 2016

(30) Foreign Application Priority Data

May 1, 2015   (JP) ................. 2015-094108

(51) Int. Cl.
*G06F 9/30*     (2018.01)
*G06F 1/3237*   (2019.01)
*G06F 1/3287*   (2019.01)
*G06F 1/3234*   (2019.01)
*G06F 1/26*     (2006.01)

(52) U.S. Cl.
CPC .............. *G06F 9/3001* (2013.01); *G06F 1/26* (2013.01); *G06F 1/3237* (2013.01); *G06F 1/3243* (2013.01); *G06F 1/3287* (2013.01); *G06F 9/30083* (2013.01); *Y02D 10/128* (2018.01); *Y02D 10/152* (2018.01); *Y02D 10/171* (2018.01); *Y02D 50/20* (2018.01)

(58) Field of Classification Search
CPC ................. G06F 1/26; G06F 1/30; G06F 1/32
See application file for complete search history.

(56) References Cited

U.S. PATENT DOCUMENTS 6,340,906 B1     1/2002   Mizutani
2001/0052800 A1  12/2001  Mizuno
(Continued)

FOREIGN PATENT DOCUMENTS

JP   2001-142558   5/2001
JP   2004-013820   1/2004
(Continued)

*Primary Examiner* — Kim Huynh
*Assistant Examiner* — Kevin M Stewart
(74) *Attorney, Agent, or Firm* — Fujitsu Patent Center

(57) ABSTRACT

An arithmetic processing device includes a plurality of arithmetic processing units each including, an internal circuit that, in an instruction processing state in which an instruction is processed, processes the instruction and that, in an instruction processing stopped state in which instruction processing is stopped, transitions to a state of power save operation, and a power control circuit that disables the power save operation; and a monitoring circuit that monitors the instruction processing stopped state of the plurality of arithmetic processing units and counts the number of the arithmetic processing units in the instruction processing stopped state. The power control circuit of each of the plurality of arithmetic processing units disables the power save operation of the arithmetic processing unit in the instruction processing stopped state, in a case where the number of the arithmetic processing units in the instruction processing stopped state exceeds a threshold.

13 Claims, 27 Drawing Sheets

(56) References Cited

U.S. PATENT DOCUMENTS

| | | | |
|---|---|---|---|
| 2011/0173471 A1 | 7/2011 | Gargash | |
| 2013/0007494 A1* | 1/2013 | Branover | G06F 1/3203 |
| | | | 713/323 |
| 2013/0262908 A1* | 10/2013 | Gomyo | G06F 1/08 |
| | | | 713/501 |
| 2014/0082332 A1 | 3/2014 | Okano | |
| 2014/0101475 A1* | 4/2014 | Berke | G06F 1/3206 |
| | | | 713/340 |
| 2014/0181554 A1* | 6/2014 | Manne | G06F 1/3234 |
| | | | 713/323 |
| 2014/0344599 A1* | 11/2014 | Branover | G06F 1/3234 |
| | | | 713/323 |
| 2016/0132096 A1* | 5/2016 | Allen-Ware | G06F 1/3287 |
| | | | 713/323 |

FOREIGN PATENT DOCUMENTS

| | | |
|---|---|---|
| JP | 2009-123235 | 6/2009 |
| JP | 2013-516710 | 5/2013 |
| JP | 2013-205905 | 10/2013 |
| JP | 2014-059761 | 4/2014 |
| WO | 2011/085313 | 7/2011 |

* cited by examiner

ARITHMETIC PROCESSING DEVICE AND METHOD OF CONTROLLING ARITHMETIC PROCESSING DEVICE

CROSS-REFERENCE TO RELATED APPLICATION

This application is based upon and claims the benefit of priority of the prior Japanese Patent Application No. 2015-094108, filed on May 1, 2015, the entire contents of which are incorporated herein by reference.

FIELD

The present invention relates to an arithmetic processing device and a method of controlling an arithmetic processing device.

BACKGROUND

An integrated circuit device represented by an arithmetic processing circuit (or a processor or a central processing unit (CPU) chip) generates power supply noise when there is a sudden change in power consumption of an internal circuit. Power supply noise is generated by the amount of current flowing in power supply wiring suddenly changing due to a sudden change in power consumption of an internal circuit and power supply voltage supplied from the power supply wiring being varied. When power supply noise is generated, there is a possibility that the internal circuit supplied with the power supply voltage malfunctions. Thus, there is a demand to lower the power supply noise as much as possible.

Regarding methods of reducing power supply noise of an arithmetic processing device or an integrated circuit device, there are descriptions in the following patent documents.
Patent literature 1: Japanese Laid-open Patent Publication No. 2013-205905
Patent literature 2: Japanese Laid-open Patent Publication No. 2014-59761
Patent literature 3: Japanese National Publication of International Patent Application No. 2013-516710
Patent literature 4: Japanese Laid-open Patent Publication No. 2009-123235
Patent literature 5: Japanese Laid-open Patent Publication No. 2004-013820
Patent literature 6: Japanese Laid-open Patent Publication No. 2001-142558

High-performance processors of recent years include a plurality of cores (or CPU cores or processor cores or arithmetic processing units) and execute a plurality of instruction sequences in parallel. Further, the high-performance processors include a plurality of arithmetic circuits within the core and execute a plurality of instruction sequences in parallel. In this manner, the power consumption of processors has increased, along with an increase in the number of cores within the processors and an increase in the number of arithmetic circuits within the cores.

In order to reduce the power consumption of such processors described above, each internal circuit represented by a register file, a random access memory (RAM), or an arithmetic circuit within the processors includes a clock gate circuit. The clock gate circuit supplies a clock to an internal circuit when in operation and stops supply of a clock when stopped. By performing fine-grained power save control utilizing the clock gate circuit in this manner, transition to the power save state is performed.

When a processor including a plurality of cores utilizes the power save control mentioned earlier in which supply of a clock is stopped, and a core shifts to the instruction processing stopped state in which processing of an instruction is stopped from the instruction processing state in which the instruction is processed, supply of a clock to a circuit within the core is stopped to reduce the power consumption of the core.

However, when the number of cores that shift to the instruction processing stopped state from the instruction processing state increases due to an increase in the number of cores within the processor, or when the number of cores that return to the instruction processing state from the instruction processing stopped state increases, the degree of increase or decrease in power consumption increases, and a great power supply noise is generated. An increase in the number of cores of a high-performance processor further increases the degree of increase or decrease in power consumption, and the degree of variation in power supply voltage due to the power supply noise increases.

SUMMARY

According to an aspect of the embodiments, an arithmetic processing device includes a plurality of arithmetic processing units each including, an internal circuit that, in an instruction processing state in which an instruction is processed, processes the instruction and that, in an instruction processing stopped state in which instruction processing is stopped, transitions to a state of power save operation, and a power control circuit that disables the power save operation; and a monitoring circuit that monitors the instruction processing stopped state of the plurality of arithmetic processing units and counts the number of the arithmetic processing units in the instruction processing stopped state. The power control circuit of each of the plurality of arithmetic processing units disables the power save operation of the arithmetic processing unit in the instruction processing stopped state, in a case where the number of the arithmetic processing units in the instruction processing stopped state exceeds a threshold.

According to a first aspect, an arithmetic processing device and a method of controlling the same that moderate the degree of variation in power consumption are provided.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
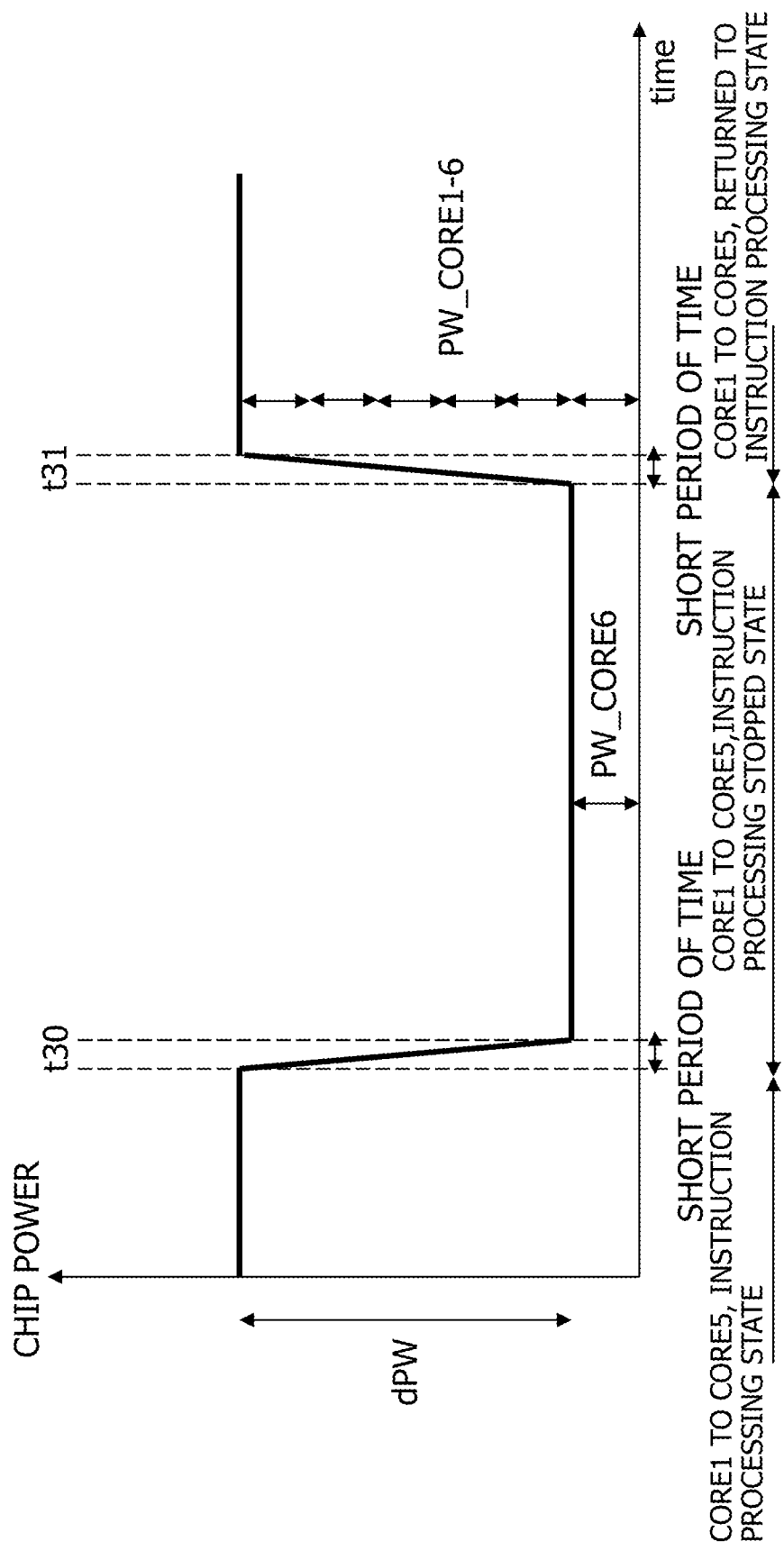
FIG. 1 is a diagram illustrating an example of variation in power consumption of a processor.

FIG. 1 is a diagram illustrating an example of variation in power consumption of a processor. The abscissa represents time, and the ordinate the power consumption of a processor chip. In the example of FIG. 1, the processor includes six cores CORE1 to CORE6. In the processor, five cores CORE1 to CORE5 shift to the instruction processing stopped state from the instruction processing state approximately at the same time at time t30, and the five cores CORE1 to CORE5 shift to the instruction processing state from the instruction processing stopped state approximately at the same time at time t31. Therefore, a degree of variation dPW upon a drop in power consumption of the processor chip at time t30 is exceptionally great, and this is followed by a great variation (rise) in power supply voltage. In a same manner, the degree of variation dPW upon a rise in power consumption of the processor chip at time t31 is also exceptionally great, and this is followed by a great fluctuation (drop) in power supply voltage.

First Embodiment

Figure 2:
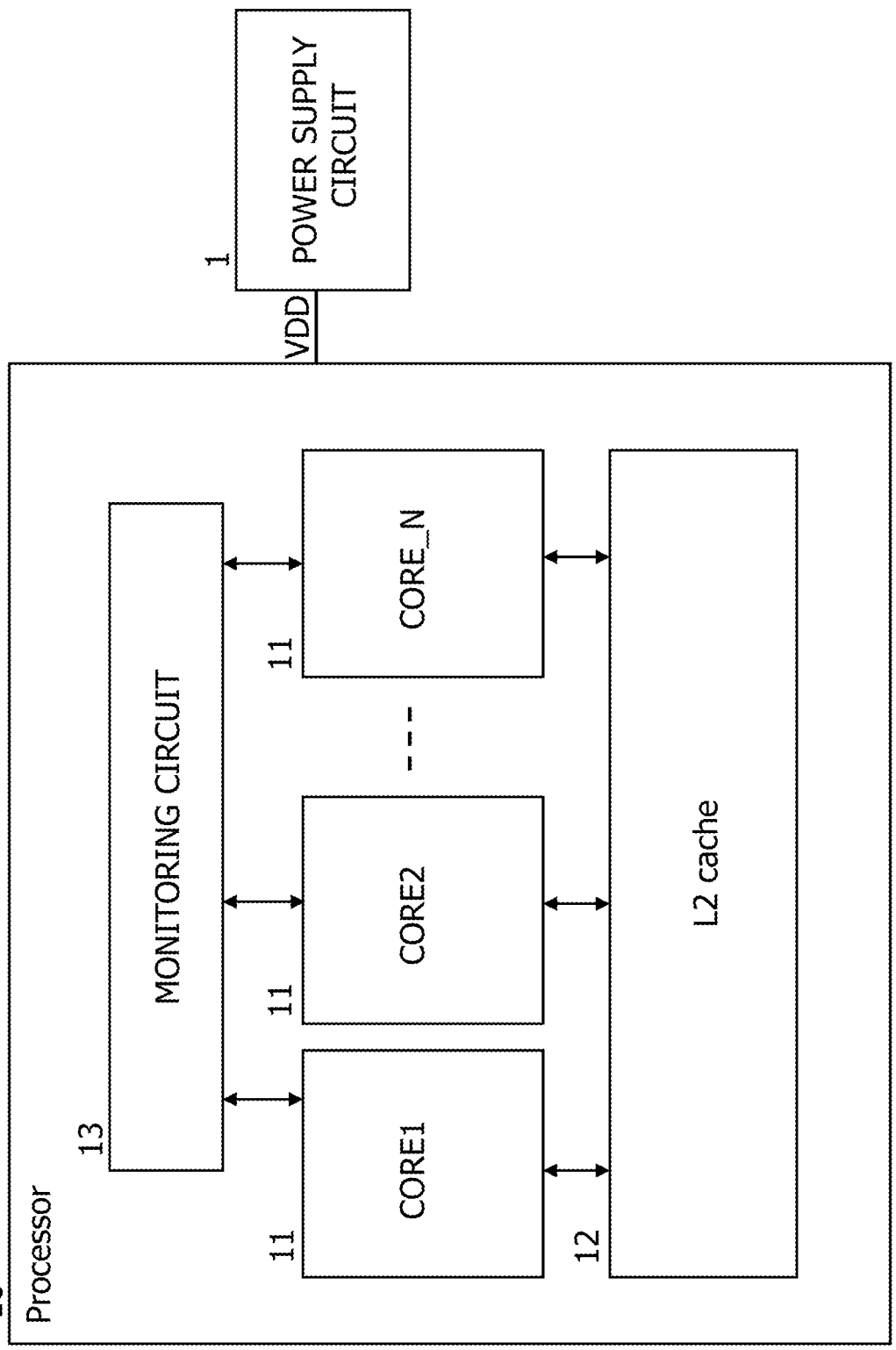
FIG. 2 is a diagram illustrating the configuration of a processor in a first embodiment.

FIG. 2 is a diagram illustrating the configuration of a processor in a first embodiment. A processor 10 includes a plurality of cores CORE1 to CORE_N and a shared level-2 cache memory 12. The processor 10 includes a monitoring circuit 13 that monitors the instruction processing stopped state of the cores CORE1 to CORE_N. The processor 10 is supplied with a power supply voltage VDD from a power supply circuit 1, and the power supply voltage VDD is supplied to each core 11, the level-2 cache memory 12, and the monitoring circuit 13 via internal power supply wiring that is not illustrated.

Figure 3:
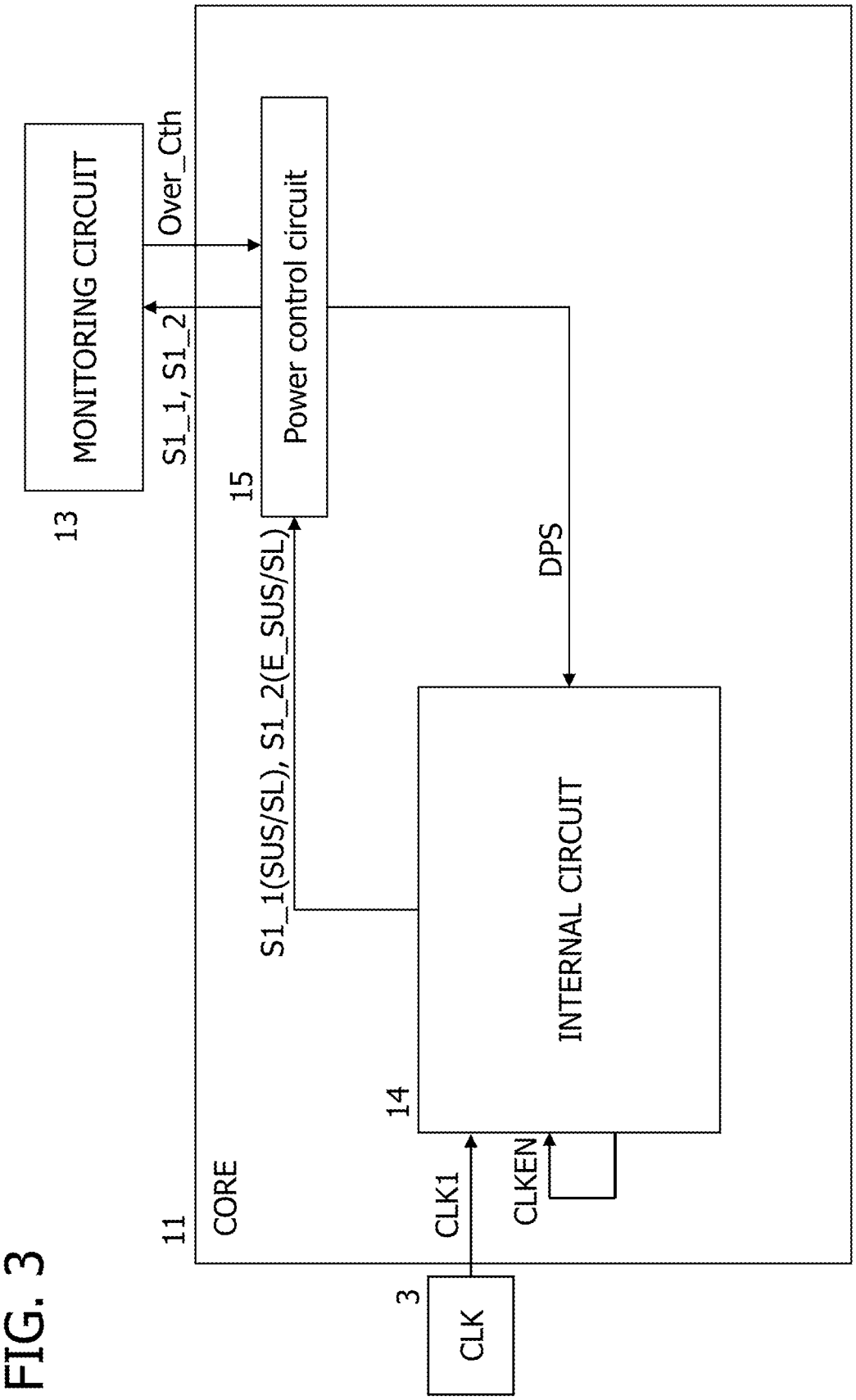
FIG. 3 is a diagram illustrating a configuration example of the core 11 within the processor.

FIG. 3 is a diagram illustrating a configuration example of the core 11 within the processor. The core 11 includes an internal circuit 14 that processes an instruction and a power control circuit 15 that performs power control of the internal circuit 14. The internal circuit 14 includes a circuit represented by a decoder or an arithmetic element that processes an instruction. The internal circuit 14 receives a clock CLK1 from a clock generation circuit 3. In accordance with a clock enable signal CLKEN, the clock CLK1 is input, or input of a clock is stopped. With the internal circuit 14, an instruction processing stop signal S1_1 notifying the instruction processing stopped state and a stop termination signal S1_2 notifying the termination of the instruction processing stopped state are output to the power control circuit 15. The power control circuit 15 outputs the signals S1_1 and S1_2 to the monitoring circuit 13. The internal circuit 14 outputs the instruction processing stop signal S1_1 when a suspend instruction SUS or a sleep instruction SL has been executed, for instance. The internal circuit 14 outputs the stop termination signal S1_2 of a suspend termination E_SUS or a sleep termination E_SL, when an interruption has occurred or the like.

The monitoring circuit 13 counts the number of cores of which instruction processing is being stopped, on the basis of the instruction processing stop signal S1_1 and the stop termination signal S1_2 supplied from the respective cores 11. A specific example will be described later.

Figure 4A:
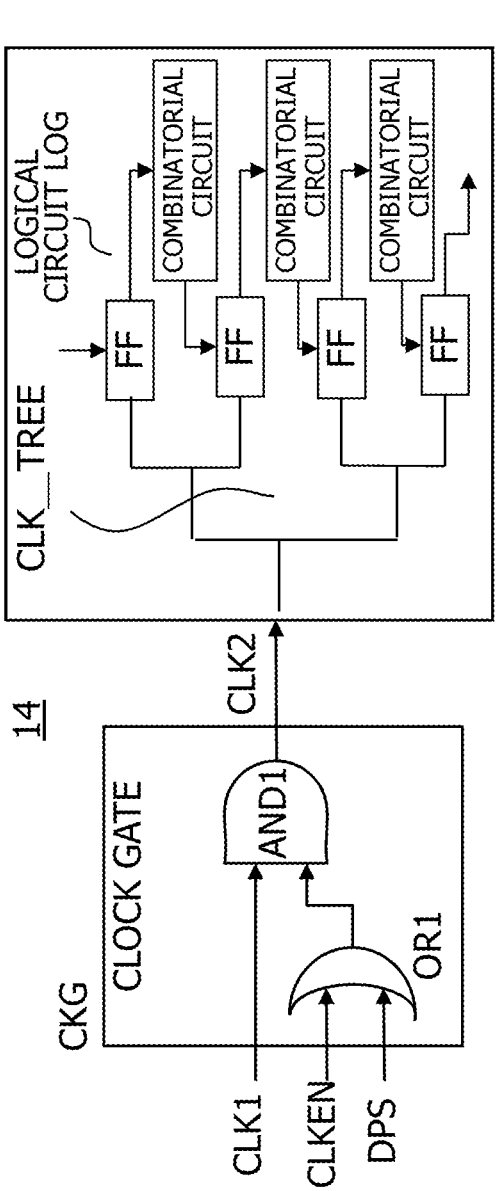
FIGS. 4A and 4B are diagrams illustrating the power save operation and the operation of prohibiting or preventing the power save operation in the internal circuit of the processor.
Figure 4B:
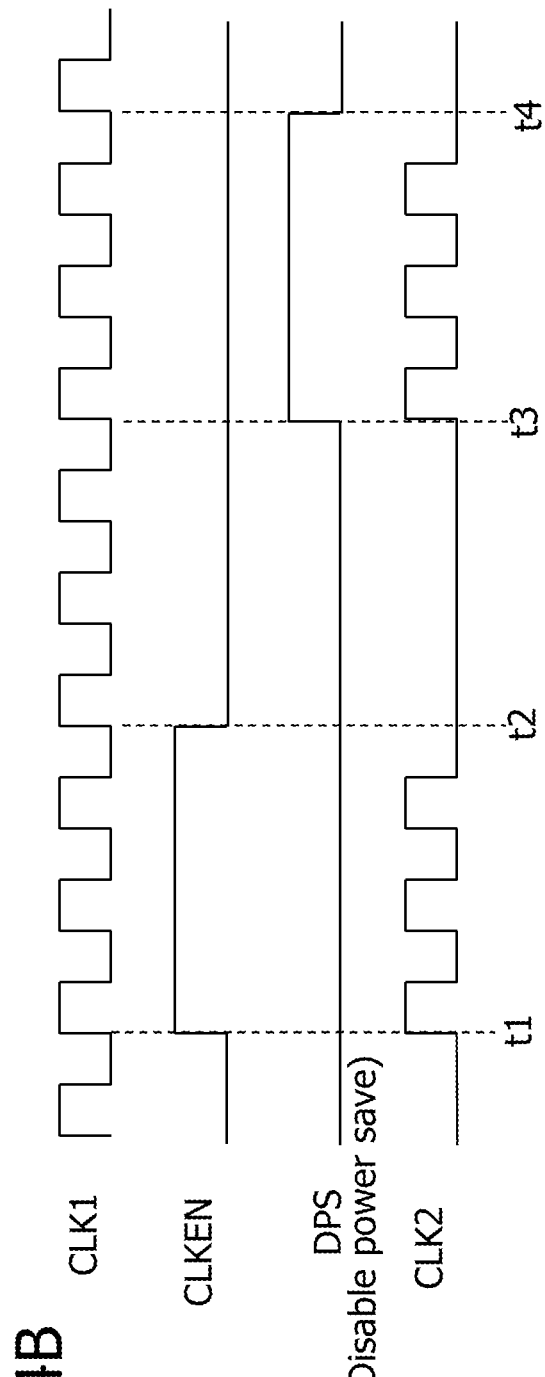

FIGS. 4A and 4B are diagrams illustrating the power save operation and the operation of prohibiting or preventing the power save operation in the internal circuit of the processor. The power save operation in this embodiment is, as one example, an operation of stopping supply of a clock to the internal circuit 14.

As illustrated in FIG. 4A, the internal circuit 14 of the core includes, for instance, a clock gate CKG that controls supply of the clock CLK1 to the internal circuit and stopping of the supply, a clock tree CLK_TREE to which a clock CLK2 output by the clock gate CKG is supplied, and a logical circuit LOG. The logical circuit LOG includes, for instance, a plurality of combinatorial circuits and a plurality of latch circuits FF provided before or after the combinatorial circuits. The latch circuit FF operates on the basis of the clock CLK2.

The clock gate CKG includes an AND gate AND1 and an OR gate OR1. In the case where the clock enable signal CLKEN is H (High level) (during time t1 to t2), as illustrated in FIG. 4B, the AND gate AND1 of the clock gate CKG causes the supplied clock CLK1 to pass through and outputs the clock CLK2 to the clock tree CLK_TREE within the internal circuit. This state is the operated state of the internal circuit. In the case where the clock enable signal CLKEN is L (Low level), the AND gate AND1 stops the clock CLK1 from passing through and saves power involving supply of the clock CLK2. By setting the clock enable signal CLKEN to L to stop the clock, the internal circuit transitions to the power save operation state to execute the power save operation. In this state, propagation of the clock CLK2 within the clock tree stops, and therefore power of the internal circuit 14 is reduced by a great amount.

The clock enable signal CLKEN is generated by, for instance, an instruction control circuit (not illustrated) within the internal circuit 14. That is, the internal circuit 14 detects whether or not operation of the logical circuit LOG is called for in accordance with the processing state of an instruction and, in the case where operation is not called for, sets the clock enable signal CLKEN to L to transition to the power save operation state. For instance, in accordance with a suspend instruction or a sleep instruction, the internal circuit 14 sets the clock enable signal CLKEN to L to transition to the power save operation state.

When the core is set to the instruction processing stopped state, the instruction control circuit within the internal circuit sets the clock enable signal CLKEN to L to transition to the power save operation state. The instruction processing stopped state causes a state of minimum power consumption, since the internal circuit does not perform instruction processing. Accordingly, supplying a clock to the internal circuit of which operation is stoppable inside the core can be stopped, and the power consumption can be reduced significantly. Meanwhile, the power control circuit 15 continues to be in the operated state.

The clock gate CKG inputs a disable power save signal DPS to the OR gate OR1. In the case where the disable power save signal DPS is H (during time t3 to t4), the clock gate CKG causes the clock CLK1 to pass through to supply the clock CLK2 to the clock tree, even when the clock enable signal CLKEN is L, as illustrated in FIG. 4B. Accordingly, the power save operation with the clock enable signal is disabled. This is the power save disabled state.

As another example of the power save operation, a power supply switch for a circuit of which operation is stoppable within the internal circuit 14 may be cut off, for instance. In that case, the power supply switch is subjected to on-off control by a power control signal (not illustrated) instead of the clock enable signal, but controlled to be on forcefully by the disable power save signal DPS. It is possible to realize the power save operation with various methods other than those described above. The power save operation is disabled by the disable power save signal DPS in any kind of power save circuit.

Figure 5:
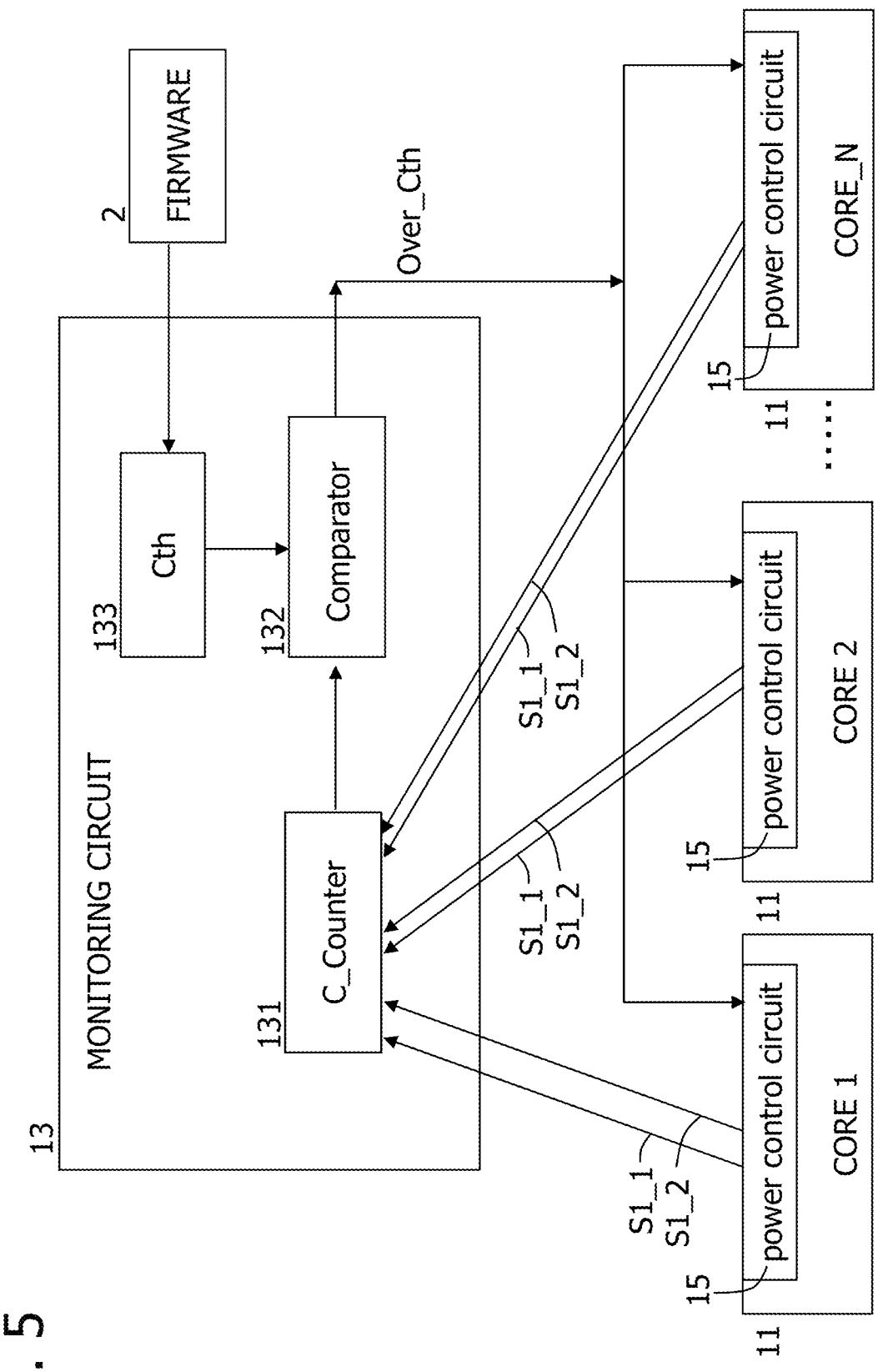
FIG. 5 is a diagram illustrating the configuration of the monitoring circuit 13 and the configuration of the core 11 in this embodiment.

FIG. 5 is a diagram illustrating the configuration of the monitoring circuit 13 and the configuration of the core 11 in this embodiment. Each core 11 includes the power control circuit 15, as illustrated in FIG. 3, and the power control circuit 15 outputs the instruction processing stop signal S1_1 and the stop termination signal S1_2 to the monitoring circuit 13.

The monitoring circuit 13 includes a counter 131 that counts the number of cores in the instruction processing stopped state. The counter 131 increases the count in response to the instruction processing stop signal S1_1 output from the power control circuit 15 of any one of the cores and decreases the count in response to the stop termination signal S1_2. As a result, a count value CNT of the counter 131 indicates the number of cores in the instruction processing stopped state.

In the example of FIG. 5, the monitoring circuit 13 further includes a threshold core number register 133 in which a threshold core number Cth output from a memory 2 for firmware is set or configured and a comparator 132 with which the count value CNT, indicating the number of cores in the instruction processing stopped state, of the counter 131 and the threshold core number Cth are compared. When the count value CNT exceeds the threshold core number Cth, the comparator 132 outputs a core number over signal (control signal) Over_Cth to the power control circuit 15 of all of the cores 11.

The power control circuit 15 of each core 11 illustrated in FIG. 3 outputs the disable power save signal DPS (H level) to the internal circuit 14, in response to the core number over signal Over_Cth. As a result, in the core in the instruction processing stopped state, the power save operation of setting the clock enable signal CLKEN to L level to stop the clock is disabled by the disable power save signal DPS (H level).

[Power Control Example 1 in First Embodiment]

Figure 6:
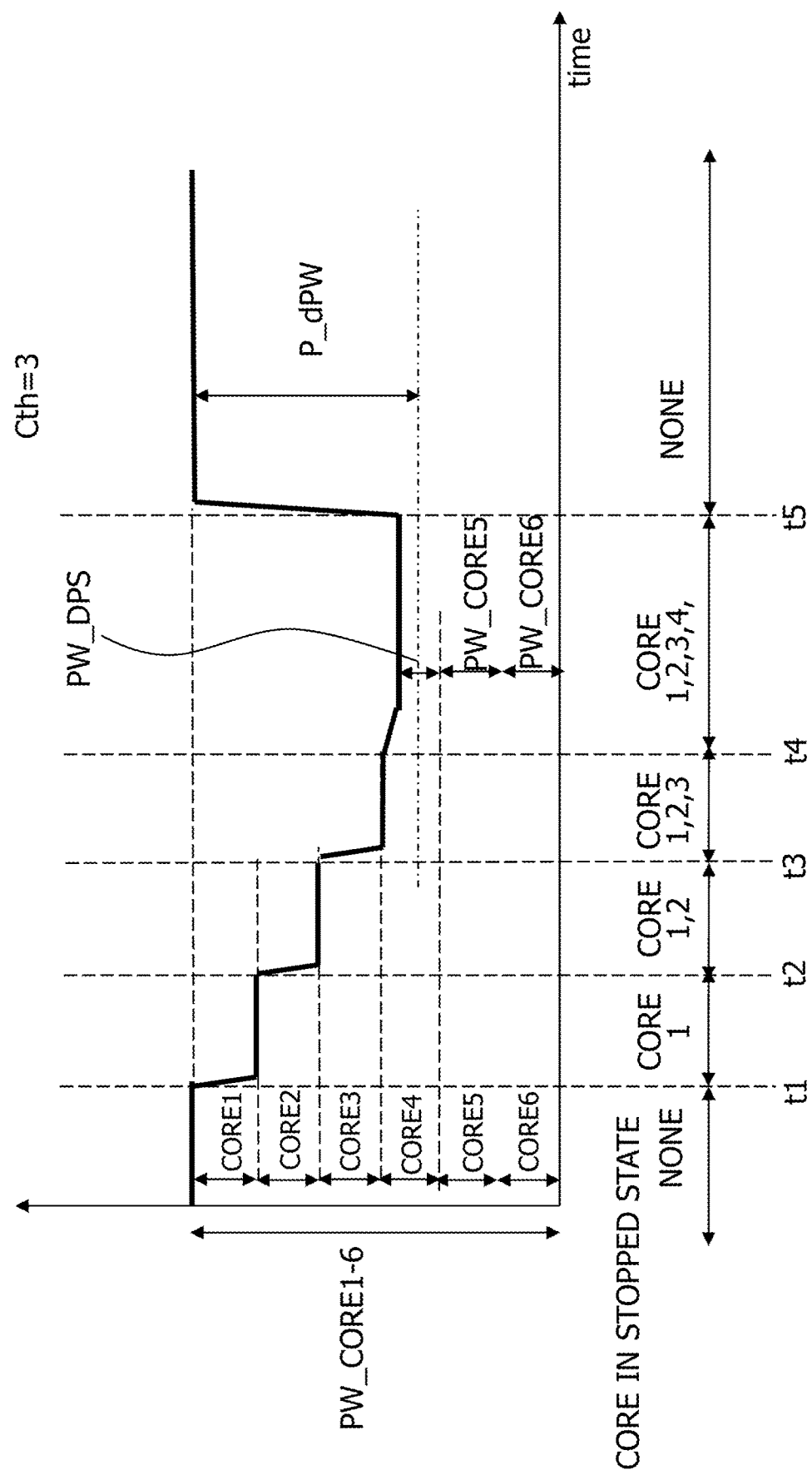
FIG. 6 is a diagram illustrating one example of power control of the processor of the first embodiment.

FIG. 6 is a diagram illustrating one example of power control of the processor of the first embodiment. The abscissa represents time, and the ordinate the power consumption of a processor chip. In this example, the processor includes six cores, the threshold core number Cth is configured to "3," and the initial value of the counter 131 within the monitoring circuit 13 is "0."

First, at time t1, the core CORE1 enters the instruction processing stopped state. That is, the instruction control circuit within the internal circuit 14 executes the suspend instruction or the sleep instruction to output the instruction processing stop signal S1_1 to the power control circuit 15, and the power control circuit 15 outputs the signal S1_1 to the monitoring circuit 13. In response to the signal S1_1, the counter 131 of the monitoring circuit 13 increases the count, setting the count value CNT to equal 1. The instruction control circuit within the internal circuit 14 sets the clock enable signal CLKEN to L level (clock disabled), so that the clock gate CKG stops the clock CLK1 from passing through, and the core CORE1 transitions to the power save operation state. As a result, as illustrated in FIG. 6, the power consumption of the processor chip drops by the power of the core CORE1.

At time t2, the core CORE2 is set to the instruction processing stopped state. Accordingly, the counter 131 of the monitoring circuit 13 sets the count value CNT as CNT=2. In a same manner to time t1, the power consumption of the processor chip drops by the amount of power consumption of the core CORE2.

At time t3, the core CORE3 is set to the instruction processing stopped state. Accordingly, the counter 131 of the monitoring circuit 13 sets the count value CNT as CNT=3. In a same manner to times t1 and t2, the power consumption of the processor chip drops by the amount of power consumption of the core CORE3.

Next, at time t4, the core CORE4 is set to the instruction processing stopped state. Accordingly, the internal circuit 14 within the core CORE4 sets the clock enable signal CLKEN to L level (clock stopped state). The count value CNT of the counter 131 of the monitoring circuit 13 is set as CNT=4, and the comparator 132 detects CNT=4>Cth=3, sets the core number over signal Over_Cth to H level, thereby detecting that the number of cores in the instruction processing stopped state has exceeded the threshold core number Cth, which equals 3.

In response to the core number over signal Over_Cth at H, the power control circuit 15 of all of the cores CORE1 to CORE 6 sets the disable power save signal DPS to H level (power save disabled state). Accordingly, the cores CORE1, CORE2, and CORE3 in power save operation due to the instruction processing stopped state and the CORE4 that is to enter the power save operation are set to the power save disabled state by the DPS at H.

As a result, a drop in power consumption of the processor chip at time t4 is less than in the case where the core CORE4 starts performing the power save operation. Power PW_DPS illustrated in FIG. 6 corresponds to the total of power consumption in the power save disabled state of the cores CORE1 to CORE4 in the instruction processing stopped state. That is, in the cores CORE1 to CORE4 in the instruction processing stopped state, stopping of the clock CLK2 in the internal circuit 14 is disabled by DPS at H, and power consumption involving propagation of the clock CLK2 occurs. Therefore, the cores CORE1 to CORE4 in the instruction processing stopped state consume the power PW_DPS with the occurrence of power consumption involving propagation of the clock CLK2.

As a result, the power consumption within the processor chip becomes the total of power PW_CORE5,6 of the cores CORE5 and CORE6 in the instruction processing stopped state and the power consumption PW_DPS in the power save disabled state of the cores CORE1 to CORE4 in the instruction processing stopped state. The difference between the total power PW_CORE5,6+PW_DPS and power PW_CORE1-6 of all cores in the instruction processing state is less than an acceptable power difference P_dPW with which the power supply noise falls within an acceptable range.

At time t5, an interruption occurs in the processor, suspend or sleep of the cores CORE1 to CORE4 is terminated, and a transition is made to the instruction processing state from the instruction processing stopped state. At this time, the cores CORE1 to CORE4 concurrently start instruction processing, and the power consumption of the processor chip suddenly rises. However, even with the concurrent starting of instruction processing at time t5, the amount of variation in power consumption that follows falls within the acceptable power difference P_dPW, since the cores CORE1 to CORE4 have been consuming power due to propagation of the clock CLK2 in the power save disabled state. The power supply noise remains within an acceptable range, and a defective operation of a circuit within the core is prevented.

In the case where an interruption occurs suddenly in the processor, the cores in the instruction processing stopped state may concurrently return to the instruction processing state. Thus, in the first embodiment, whether the number of cores in the instruction processing stopped state exceeds the threshold core number Cth is determined every time each core enters the instruction processing stopped state, and, in the case of exceedance, the power save operation of the core in the instruction processing stopped state is disabled. As a result, the degree of power variation is moderated to the acceptable range P_dPW, even when a plurality of cores in the stopped state concurrently return to the instruction processing state with the occurrence of a sudden interruption.

It is desirable to set or configure the threshold core number Cth described above in accordance with the acceptable power difference P_dPW of power variation, the amount of drop in power (amount of power saving) in the case where the core transitions to the instruction processing state from the instruction processing stopped state, and the amount of drop in power (amount of power saving) in the case where the core disables the power save operation before transitioning to the instruction processing stopped state from the instruction processing state.

It is desirable to set or configure the threshold core number Cth, such that the power difference between the power consumption in the case where the power save operation of a plurality of cores in the instruction processing stopped state has been disabled and the power consumption when the plurality of cores in the instruction processing stopped state have all returned to the instruction processing state from the instruction processing stopped state becomes less than or equal to the acceptable power difference P_dPW. The power difference corresponds to the amount of power saving by the plurality of cores.

In the case where the cores shift to the instruction processing stopped state from the instruction processing state one after another in the first embodiment, as described above, the power consumption of the processor drops steeply at first. However, after the number of cores in the instruction processing stopped state has exceeded the threshold core number, the drop rate lowers. The power variation when a plurality of cores in the instruction processing stopped state concurrently return to the instruction processing state is moderated to less than or equal to the acceptable power difference P_dPW.

[Power Control Example 2 in First Embodiment]

Figure 7:
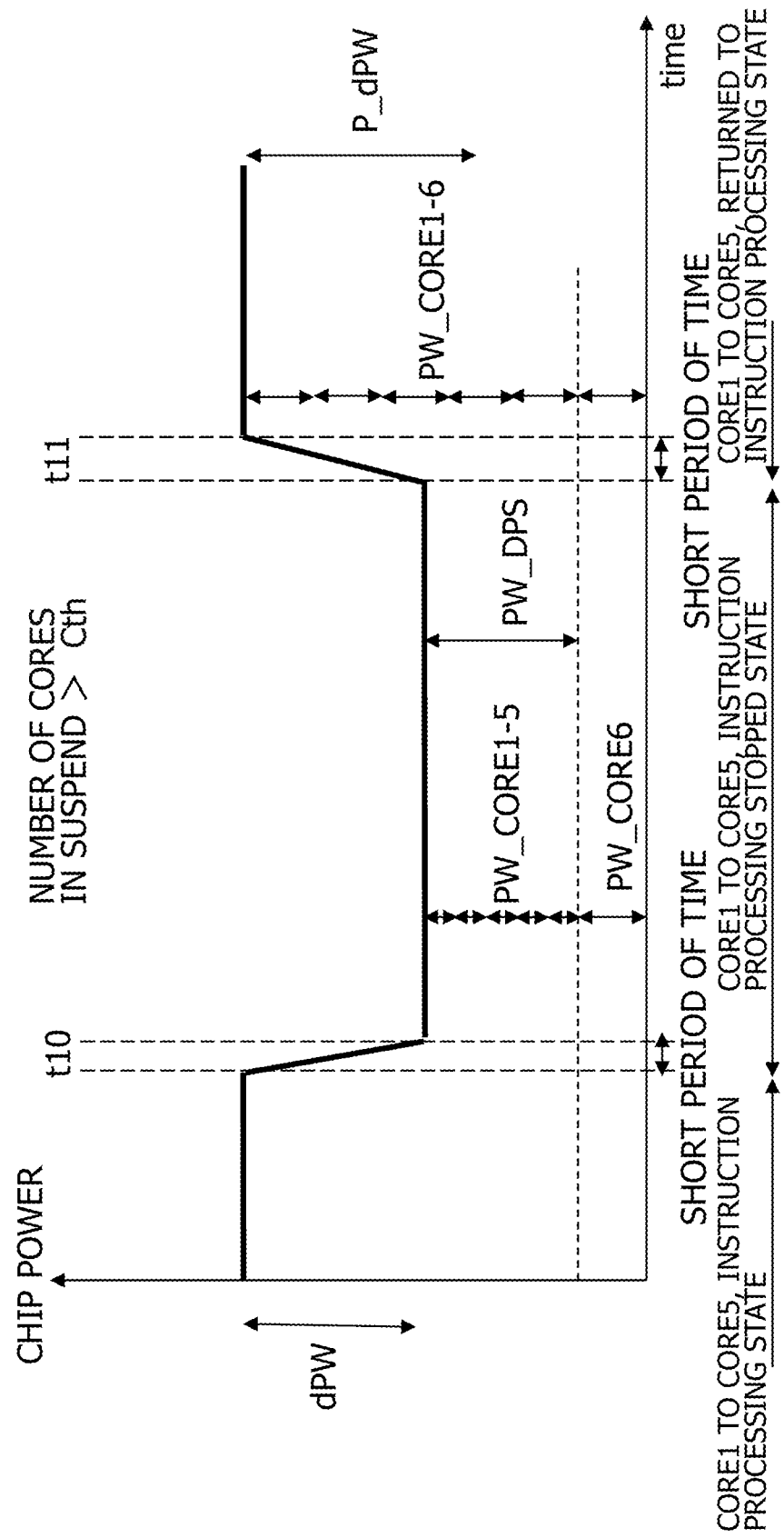
FIG. 7 is a diagram illustrating another example of power control of the processor in the first embodiment.

FIG. 7 is a diagram illustrating another example of power control of the processor in the first embodiment. In this example as well, the processor includes six cores, the threshold core number Cth is configured to "3," and the initial value of the counter 131 within the monitoring circuit 13 is "0."

At time t10, in this example, the five cores CORE1 to CORE5 transition to the instruction processing stopped state from the instruction processing state in a short period of time. In that case, the instruction control circuit of the internal circuit 14 of each core outputs the instruction processing stop signal S1_1 to the monitoring circuit 13 via the power control circuit 15 and sets the clock enable signal CLKEN to L level (clock stopped state and power save disabled state) after a predetermined short period of time.

Meanwhile, in the case where the instruction processing stop signal S1_1 has been received from each of the five cores CORE1 to CORE5 during the predetermined short period of time described above, the count value CNT is set as CNT=5 (>Cth=3), and the monitoring circuit 13 sets the core number over signal Over_Cth to H level. In the respective cores CORE1 to CORE5, the internal circuit 14 attempts to set the clock enable signal CLKEN to L level to perform the power save operation after the predetermined short period of time, but since the power control circuit 15 sets the disable power save signal DPS to H level (disable power save), the cores CORE1 to CORE5 transition to the instruction processing stopped state in the power save disabled state. Therefore, a power variation dPW caused by the cores CORE1 to CORE5 at time t10 falls within the acceptable power difference P_dPW, and the power supply noise falls within the acceptable range.

That is, at time t10, in the case where a plurality of cores exceeding the threshold core number Cth transition to the instruction processing stopped state concurrently in the predetermined short period of time, the amount of drop in power consumption of the processor (that is the amount of power saving by stopping of instruction processing and is equal to the degree of power variation dPW) in the case where the power save operation of the plurality of cores CORE1 to CORE5 in the instruction processing stopped state has been disabled becomes less than or equal to the acceptable power difference P_dPW. The degree of power variation dPW that is the amount of power saving is the power difference between the power consumption PW_CORE1-6 of the processor in the case where the six cores are in the instruction processing state and the total (PW_CORE6+PW_DPS) of the power PW_DPS in the case where the five cores CORE1 to CORE5 are in the power save disabled state and the power PW_CORE6 of the core CORE6 in the instruction processing state. At time t10, the power control circuit of the plurality of cores CORE1 to CORE5 executes disabling of the power save operation, so that the degree of power variation dPW becomes less than or equal to the acceptable power difference P_dPW.

Next, at time t11, an interruption occurs in the processor, and the five cores CORE1 to CORE5 in the instruction processing stopped state concurrently return to the instruction processing state. However, prior to time t11, the five cores CORE1 to CORE5 have been in the power save prohibited state, although in the instruction processing stopped state. Thus, the power variation dPW of the processor chip upon returning to the instruction processing state at time t11 is within the acceptable power difference P_dPW, the power supply noise is within the acceptable range, and malfunctioning of the processor is prevented.

That is, in this embodiment, the amount of drop in power consumption of the processor (that is equal to the power variation dPW at the time of return to the instruction processing state) in the case where the plurality of cores CORE1 to CORE5 in the instruction processing stopped state are in the power save disabled state becomes less than or equal to the acceptable power difference P_dPW at time t11. Immediately prior to time t11, the power control circuit of the plurality of cores CORE1 to CORE5 executes disabling of the power save operation, so that the degree of power variation dPW becomes less than or equal to the acceptable power difference P_dPW.

The operation at time t11 is identical to FIG. 6.

[Power Control Example 3 in First Embodiment]

Figure 8:
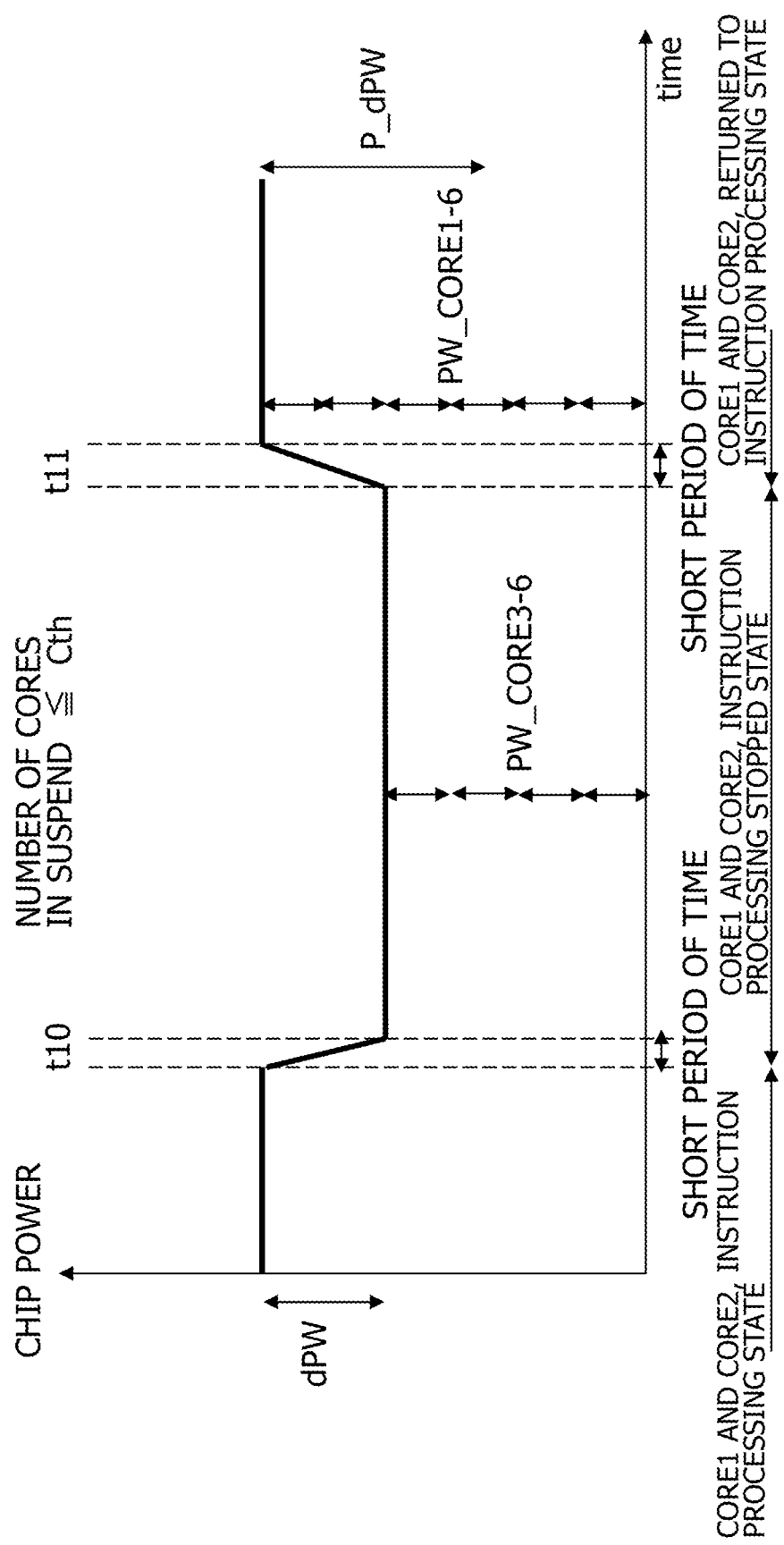
FIG. 8 is a diagram illustrating still another example of power control of the processor in the first embodiment.

FIG. 8 is a diagram illustrating still another example of power control of the processor in the first embodiment. In this example as well, the processor includes six cores, the threshold core number Cth is configured to "3," and the initial value of the counter 131 within the monitoring circuit 13 is "0."

At time t10, in this example, the cores CORE1 and CORE2 transition to the instruction processing stopped state from the instruction processing state in a short period of time. In that case as well, the instruction control circuit of the internal circuit 14 of the respective cores CORE1 and CORE2 outputs the instruction processing stop signal S1_1 to the monitoring circuit 13 via the power control circuit 15 and sets the clock enable signal CLKEN to L level (clock stopped state and power save operation state) after a predetermined short period of time.

However, since the number of cores in the instruction processing stopped state is "2" and does not exceed the threshold core number Cth (which equals 3), the monitoring circuit 13 keeps the core number over signal Over_Cth at L level. As a result, the power control circuit 15 of the two cores CORE1 and CORE2 maintains the disable power save signal DPS at L level, and the internal circuit 14 executes a transition to the power save operation state.

Note that, since the number of cores that transition to the instruction processing stopped state concurrently in the short period of time is two, the power variation dPW at time t10 is less than the acceptable power difference P_dPW, and the power supply noise is within the acceptable range.

At time t11, an interruption occurs in the processor, and the cores CORE1 and CORE2 in the instruction processing stopped state concurrently return to the instruction processing state. However, the power variation dPW at that time is less than the acceptable power difference P_dPW, and the power supply noise is within the acceptable range.

[Modified Example of Monitoring Circuit and Power Control Circuit of First Embodiment]

The monitoring circuit of FIG. 5 is shared by the plurality of cores, includes the threshold core number register 133 that configures the threshold core number Cth and the comparator 132, and outputs the core number over signal Over_Cth common to the plurality of cores.

In contrast, in a modified example, the monitoring circuit 13 of FIG. 5 includes the counter 131, and the power control circuit 15 of each core separately includes the threshold core number register 133 and the comparator 132 to separately configure the threshold core number. In the case of such a configuration, each core separately and flexibly controls frequency of the power save disabled state that are controlled in correspondence with the number of cores in the instruction processing stopped state.

Figure 9:
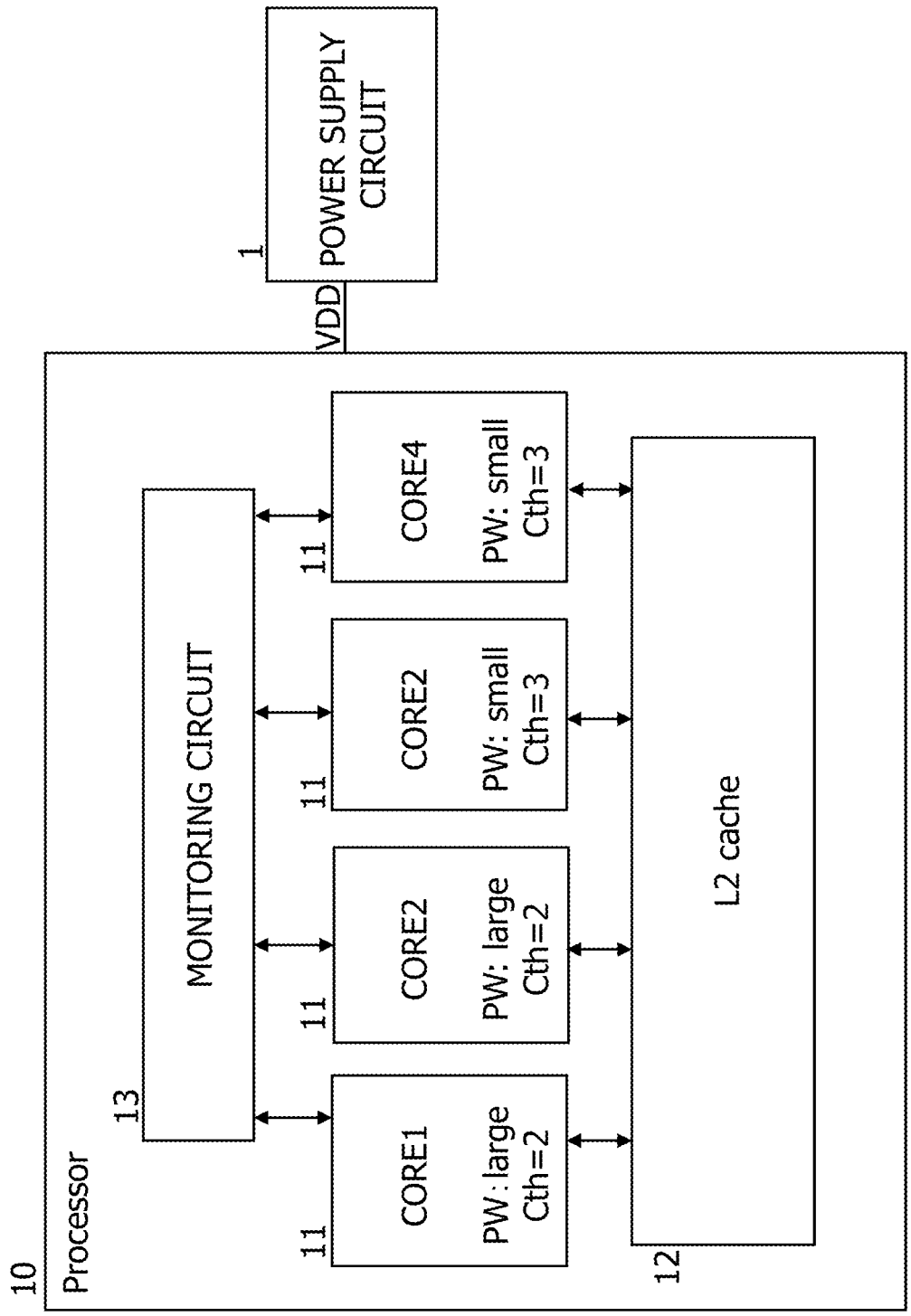
FIG. 9 is a configuration diagram of a processor in the modified example of the first embodiment.

FIG. 9 is a configuration diagram of a processor in the modified example of the first embodiment. In the modified example, the threshold core number Cth is configured separately in the four cores CORE1 to CORE4. For instance, the cores CORE1 and CORE2 with great power consumption is configured with a lower threshold core number Cth, which equals 2, so that the cores CORE1 and CORE2 are more frequently controlled to the power save disabled state (power save disabling is controlled strongly), while the cores CORE3 and CORE4 with less power consumption is configured with a greater threshold core number Cth, which equals 3, so that the cores CORE3 and CORE4 are less frequently controlled to the power save disabled state (power save disabling is controlled loosely). Specifically, this corresponds to the configuration illustrated in FIG. 18 described later.

Second Embodiment

In a second embodiment, a plurality of cores within a processor include a plurality of internal circuits. The plurality of internal circuits are controllable separately or collectively to the clock stopped state with the clock enable signal CLKEN. Further, in the case of disabling the power save operation of the core in the instruction processing stopped state, the number of internal circuits controlled to the power save disabled state by a power control circuit of each core is in accordance with the number of cores in the instruction processing stopped state.

For instance, the power control circuit causes the number of internal circuits of which the power save operation is disabled to be greater in the case where the number of cores in the instruction processing stopped state is a second number that is greater than a first number, than in the case where the number of cores in the instruction processing stopped state is the first number. Through such control, in the case where the number of cores in the instruction processing stopped state is not great, the processor disables the power save operation of a less number of internal circuits so that the amount of power saving per each core is increased. On the other hand, in the case where the number of cores in the instruction processing stopped state is great, the processor disables the power save operation of a greater number of internal circuits so that the amount of power saving per each core is decreased. Accordingly, the processor saves power maximally within a range of the acceptable power difference P_dPW.

Figure 10:
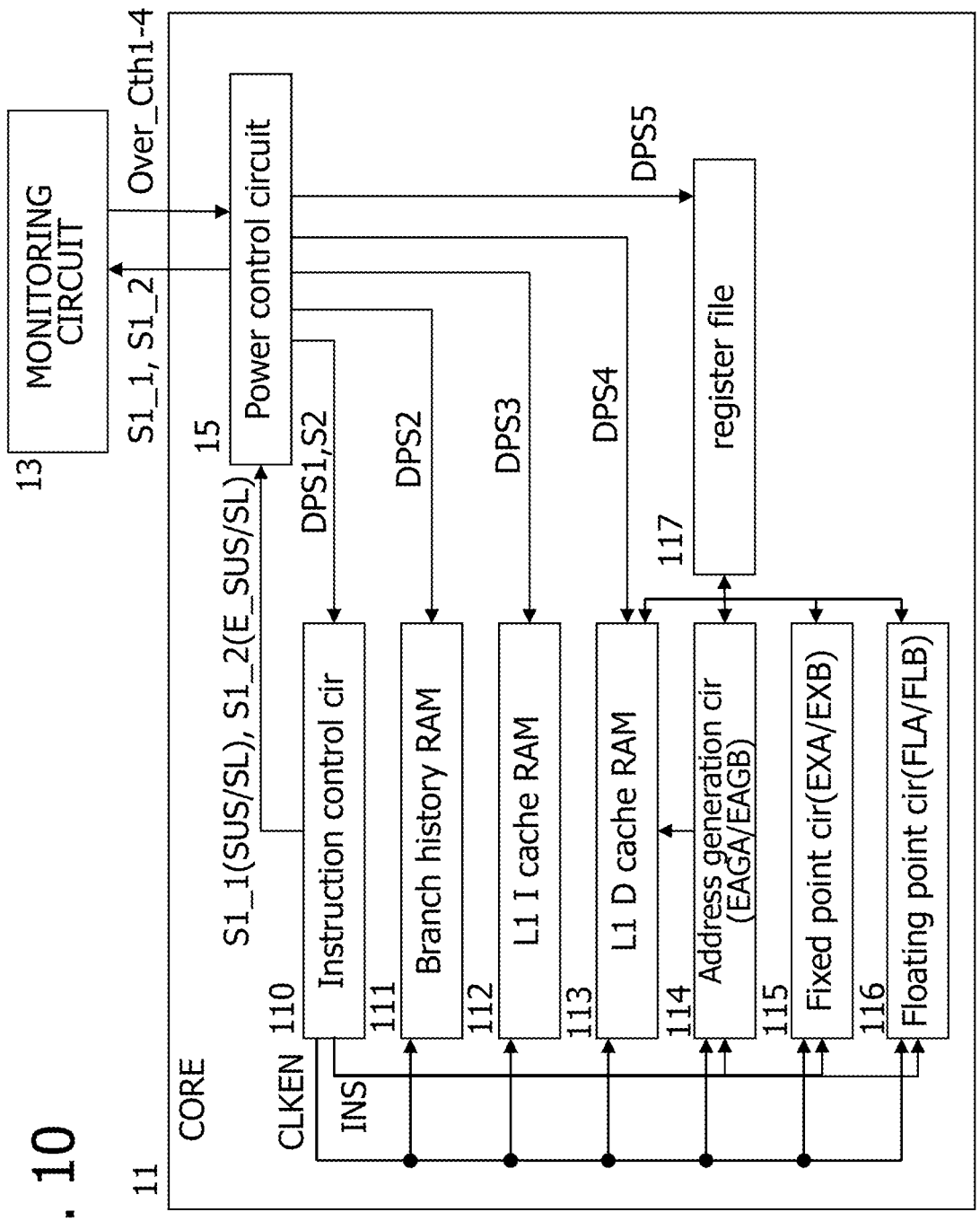
FIG. 10 is a diagram illustrating the configuration of the core in the second embodiment.

FIG. 10 is a diagram illustrating the configuration of the core in the second embodiment. In the core 11, there are a plurality of divided internal circuits. That is, the core 11 includes, as an internal circuit, an instruction control circuit 110 that fetches and decodes an instruction, a branch history memory 111 that stores branch history, a level-1 instruction cache memory 112, and a level-1 data cache memory 113. Further, the core 11 includes, as an internal circuit, three arithmetic elements of an address generation circuit 114, a fixed-point arithmetic element 115, and a floating-point arithmetic element 116 and a register file 117. As illustrated in FIGS. 4A and 4B, these internal circuits include the clock gate CKG that performs supply and stopping of a clock and are separately or collectively controlled to the clock supplied or stopped state by the clock enable signal CLKEN. The clock enable signal CLKEN is output by, for instance, the instruction control circuit 110. The power control circuit and the internal circuit described above will be briefly described below.

With the power control circuit 15, the instruction processing stop signal S1_1 notifying a transition to the suspend state or the sleep state and the stop termination signal S1_2 notifying the termination of the suspend state or the sleep state are received from the instruction control circuit 110 and output to the monitoring circuit 13. The power control circuit 15 outputs disable power save signals DPS1 to DPS5 respectively to the instruction control circuit 110, the branch history memory 111, the level-1 instruction cache memory 112, the level-1 data cache memory 113, and the register file 117.

The instruction control circuit 110 sequentially executes an instruction sequence read from the level-1 instruction cache memory 112. When a suspend instruction or a sleep instruction is executed, the instruction control circuit 110 transitions to the suspend state or the sleep state in accordance with the instruction to stop instruction processing and outputs the instruction processing stop signal S1_1 notifying the transition to the power control circuit 15. The instruction control circuit 110 monitors whether a termination condition (time, external interruption, or the like) for the suspend state or the sleep state is met. When the termination condition for the suspend instruction or the sleep instruction is met, the instruction control circuit 110 terminates the suspend state or the sleep state to resume instruction processing and outputs the stop termination signal S1_2 notifying the termination to the power control circuit 15. In the instruction processing stopped state of the suspend state or the sleep state, the instruction control circuit 110 controls a part of the internal circuits to the power save state with the clock enable signal CLKEN.

The branch history memory 111 is a memory that stores the branch history, represented by a branch destination address or whether or not branching has succeeded, of a branch instruction that has been executed in the past.

The level-1 instruction cache memory 112 is a memory that stores an instruction to be executed. The level-1 data cache memory 113 is a RAM that stores data to be used upon instruction execution. Further, the register file 117 is a register group that hold data to be used in various arithmetic processing.

The floating-point arithmetic element 116 is an arithmetic element that performs floating-point arithmetic and includes two floating-point arithmetic elements FLA and FLB. The floating-point arithmetic element 116 reads data from the register file 117, executes arithmetic for the data, and writes a result of the arithmetic into the register file 117. The floating-point arithmetic elements FLA and FLB include, for instance, equivalent functions, but may be configured such that the floating-point arithmetic element FLB is able to process only a part of arithmetic that can be processed with the floating-point arithmetic element FLA.

The fixed-point arithmetic element 115 is an arithmetic element that performs fixed-point arithmetic and includes two fixed-point arithmetic elements EXA and EXB. The fixed-point arithmetic element 115 reads data from the register file 117, executes arithmetic for the data, and writes a result of the arithmetic into the register file 117. The fixed-point arithmetic elements EXA and EXB include, for instance, equivalent functions, but may be configured such that the fixed-point arithmetic element EXB is able to process only a part of a function that can be processed by the fixed-point arithmetic element EXA.

The address generation circuit 114 calculates an address of a memory that is a load target or a store target for a load instruction or a store instruction. The address generation circuit 114 includes two address generation circuits EAGA and EAGB. The address generation circuit 114 reads data from the register file 117, generates an address on the basis of the data, and executes access to the level-1 data cache memory 113. The address generation circuit 114 writes data read from the level-1 data cache memory 113 into the register file 117, in the case of a load instruction, or writes data read from the register file 117 into the level-1 data cache memory 113, in the case of a store instruction. The address generation circuits EAGA and EAGB include equivalent functions, but may be configured such that the address generation circuit EAGB is able to process only a part of a function that can be processed by EAGA.

As mentioned earlier, a part of the instruction control circuit 110, the branch history memory 111, the level-1 instruction cache memory 112, the level-1 data cache memory 113, and the register file 117 are each caused to shift to the power save state by the clock enable signal CLKEN at L, in the case where operation is not performed and in the case where the core is in the instruction processing stopped state. Note that, in the case where the power control circuit 15 outputs the disable power save signals DPS1 to DPS5 at H level (power save disabled state), a clock gate within each circuit executes supply of a clock to disable the power save operation.

Figure 11:
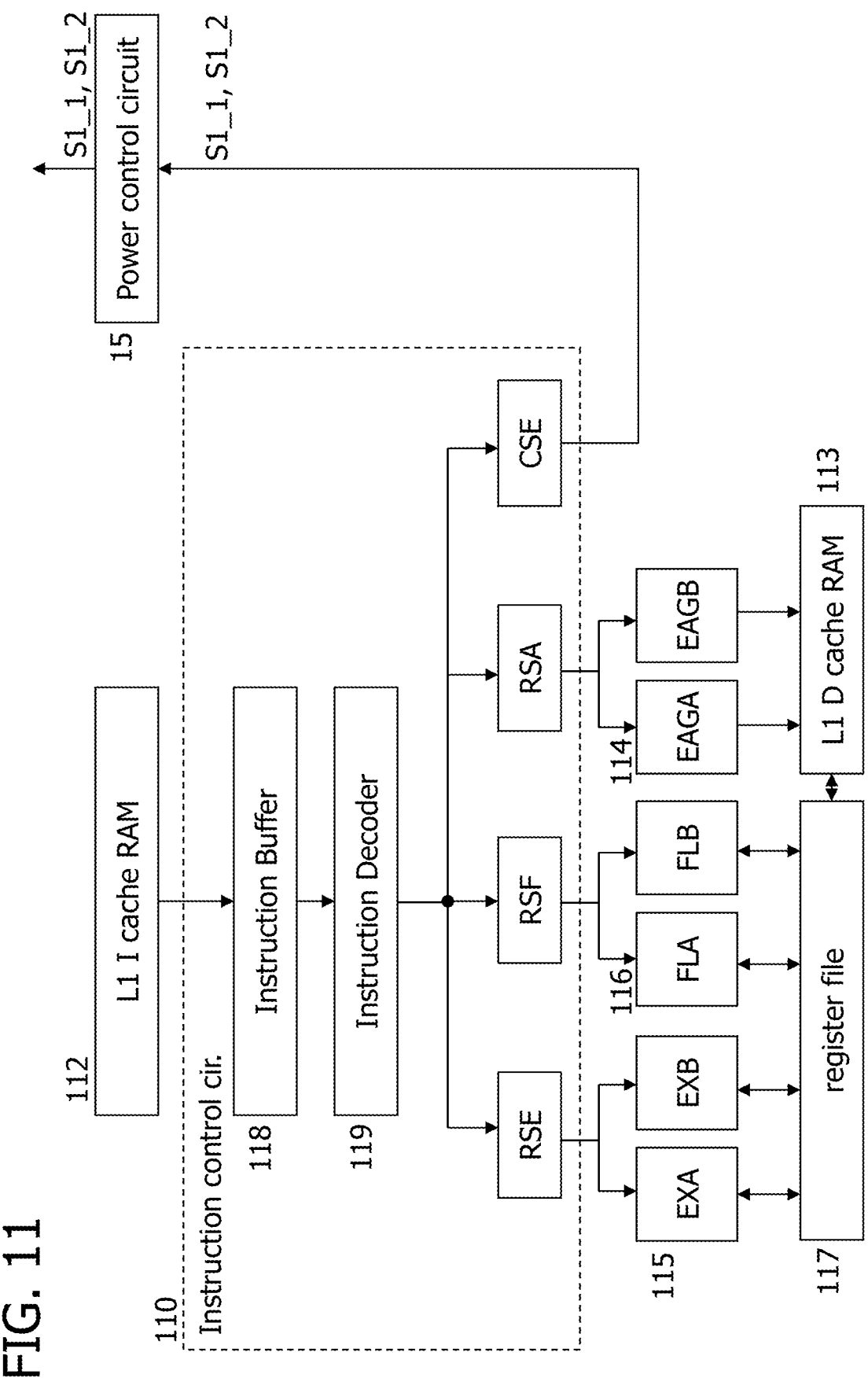
FIG. 11 is a diagram illustrating the configuration of the instruction control circuit within the core in FIG. 10.

FIG. 11 is a diagram illustrating the configuration of the instruction control circuit within the core in FIG. 10. The instruction control circuit 110 includes an instruction buffer 118, an instruction decoder 119, a reservation station RSE for fixed-point arithmetic, a reservation station RSF for floating-point arithmetic, a reservation station RSA for address generation, and a commit stack entry CSE. The instruction buffer 118 temporarily stores an instruction read from the level-1 instruction cache memory 112 and supplies the instruction to the instruction decoder 119.

The instruction decoder 119 decodes the instruction supplied from the instruction buffer 118, issues the instruction to the respective reservation stations RSE, RSF, and RSA in accordance with the instruction type and also issues all instructions to the commit stack entry CSE. The instruction decoder 119 outputs the clock enable signal CLKEN with respect to a circuit of which operation is not performed, in accordance with the instruction.

RSE receives a fixed-point arithmetic instruction from the instruction decoder 119, waits until data called for in arithmetic processing is ready, and then outputs the instruction and the data to one of the fixed-point arithmetic elements EXA and EXB.

RSF receives a floating-point arithmetic instruction from the instruction decoder 119, waits until data called for in arithmetic processing is ready, and then outputs the instruction and the data to one of the floating-point arithmetic elements FLA and FLB.

RSA receives a load instruction or a store instruction from the instruction decoder 119, waits until data called for in load address calculation or store address calculation is ready, and then outputs the instruction and the data to one of the address generation circuits EAGA and EAGB.

The commit stack entry CSE causes operations of the respective arithmetic elements to be completed in the order of the instructions issued by the instruction decoder 119 and outputs a control signal necessary for the completion. For instance, when a suspend instruction or a sleep instruction is completed, CSE outputs the instruction processing stop signal S1_1 to the power control circuit 15. In a same manner, when an interruption occurs, CSE outputs the stop termination signal S1_2 to the power control circuit 15.

Figure 12:
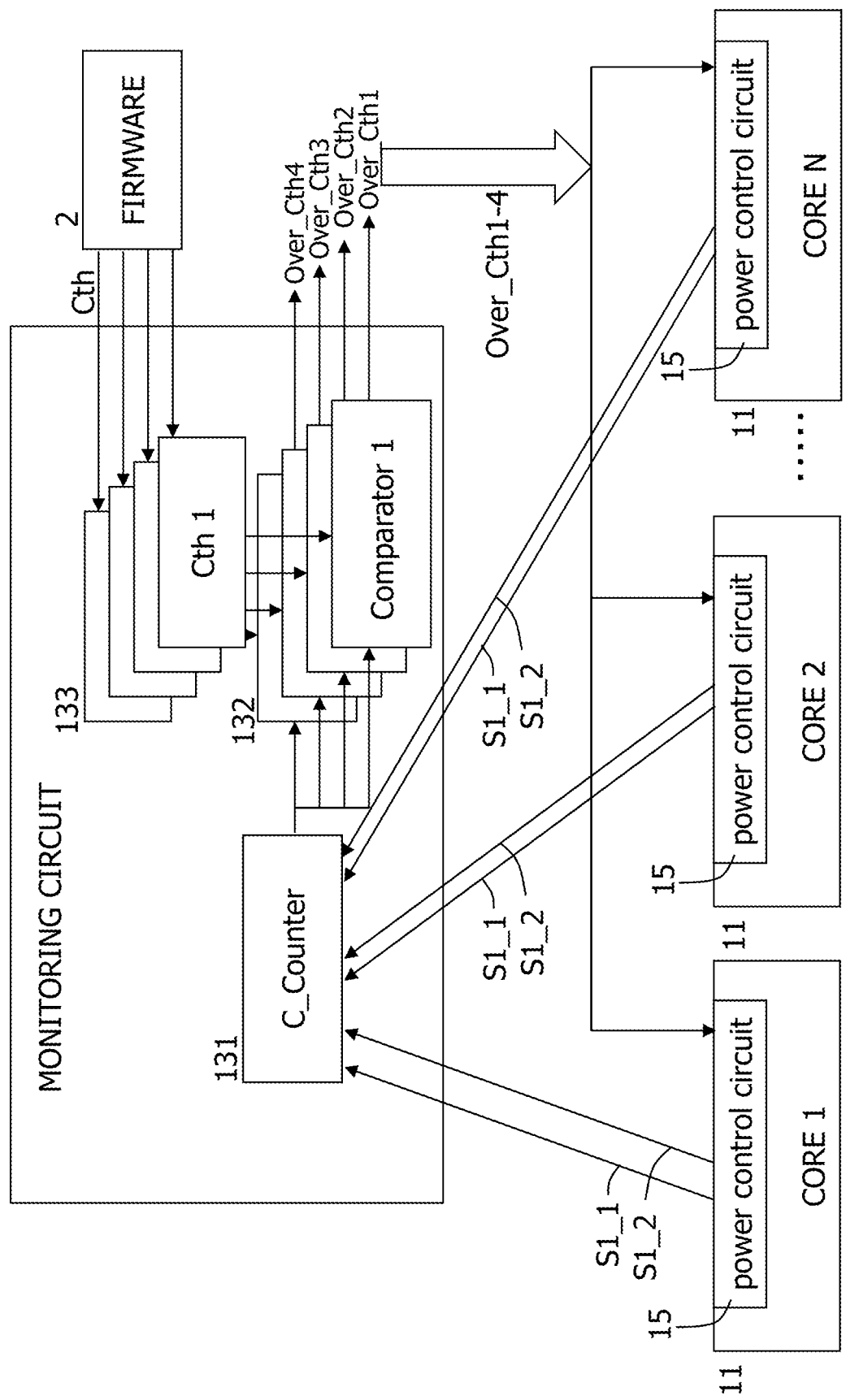
FIG. 12 is a diagram illustrating the configuration of the monitoring circuit 13 in the second embodiment.

FIG. 12 is a diagram illustrating the configuration of the monitoring circuit 13 in the second embodiment. Unlike the monitoring circuit of the first embodiment illustrated in FIG. 5, the monitoring circuit 13 of FIG. 12 includes a plurality of the threshold core number registers 133 and, in correspondence therewith, includes a plurality of the comparators 132 that respectively compare the count value CNT of the counter 131 counting the number of cores in the instruction processing stopped state and a plurality of threshold core numbers Cth1 to Cth4. In an example of FIG. 12, four threshold core number registers 133 and four comparators 132 are included.

In the four threshold core number registers 133, any value from 0 up to a maximum value of the counter is configurable as the threshold core number Cth. In a desirable example, the four different threshold core numbers Cth1 to Cth4 are configured in the order from a low value to a great value in the four threshold core number registers 133. In accordance with an increase in the count value CNT of the counter 131, the four comparators 132 respectively output core number over signals Over_Cth1 to Over_Cth4 (H level) to the power control circuits 15 within the plurality of cores 11. The threshold core numbers Cth1 to Cth4 are configured in the threshold core number register 133 at a predetermined timing, e.g., at the time of activation of the processor, from the memory 2 storing firmware.

Figure 13:
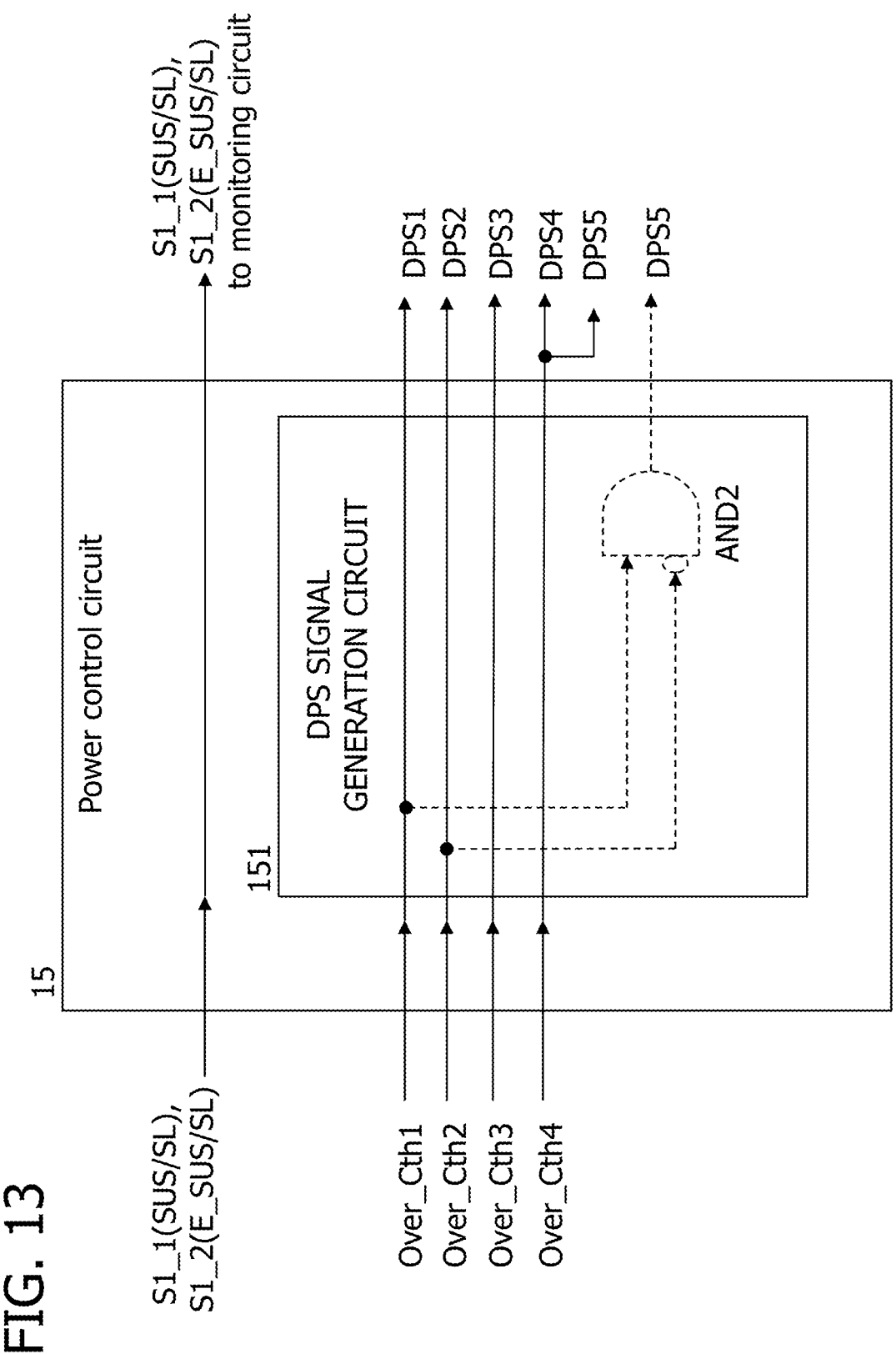
FIG. 13 is a diagram illustrating the configuration of the power control circuit 15 of each core in the second embodiment.

FIG. 13 is a diagram illustrating the configuration of the power control circuit 15 of each core in the second embodiment. The power control circuit 15 transfers the instruction processing stop signal S1_1 and the stop termination signal S1_2 from the instruction control circuit 110 within the core to the monitoring circuit 13. Further, the power control circuit 15 includes a DPS signal generation circuit 151 that generates the disable power save signals DPS1 to DPS5, on the basis of the core number over signals Over_Cth1 to Over_Cth4 from the comparators 132.

For instance, the DPS signal generation circuit 151 outputs the core number over signals Over_Cth1 to Over_Cth4 unchanged as the disable power save signals DPS1 to DPS4 and further outputs the core number over signal Over_Cth5 unchanged as the disable power save signal DPS5.

For instance, assume that the threshold core numbers Cth1 to Cth4 have been configured respectively to 2, 3, 4, and 5. In this case, through the four comparators 132 of the monitoring circuit 13, the numbers of cores in the instruction processing stopped state becoming 3, 4, 5, and 6 respectively set the disable power save signal DPS1 to H level, DPS1 and DPS2 to H level, DPS1, DPS2, and DPS3 to H level, and DPS1, DPS2, DPS3, DPS4 and DPS5 to H level. That is, in the case of disabling the power save operation of the core in the instruction processing stopped state, the power control circuit 15 of each core controls the number of internal circuits controlled to the power save disabled state in accordance with the number of cores in the instruction processing stopped state. In the example described above, greater a number of cores in the instruction processing stopped state is, greater a number of internal circuits that are controlled to the power save disabled state is.

In another example, assume that the threshold core numbers Cth1 to Cth3 have been configured to "3," and the threshold core number Cth4 has been configured to "4." In this case, through the four comparators 132 of the monitoring circuit 13, the number of cores in the instruction processing stopped state becoming 4 sets the core number over signals Over_Cth1 to Over_Cth3 to H level, and three internal circuits are set to the power save disabled state by the disable power save signals DPS1 to DPS3 at H level (disabled state). The number of cores in the instruction processing stopped state becoming 5 sets all of the core number over signals Over_Cth1 to Over_Cth4 to H level, and five internal circuits are set to the power save disabled state by the disable power save signals DPS1 to DPS5 at H level (disabled state). In this case as well, the power control circuit 15 of each core controls a greater number of internal circuits to the power save disabled state, when there are a greater number of cores in the instruction processing stopped state.

The DPS signal generation circuit 151 may generate the disable power save signals DPS1 to DPS5 from the core number over signals Over_Cth1 to Over_Cth4 with any logic. For instance, as with an AND circuit AND2 illustrated with a broken line of FIG. 13, the disable power save signal DPS5 may be generated by a logical conjunction of the core number over signal Over_Cth1 and an inverted logical value of Over_Cth2. In the case where, for instance, the threshold core number Cth1 is configured to equal 2 and Cth2 to equal 3, the AND circuit AND2 as such sets the disable power save signal DPS5 to H level (disabled state) only in the case where the number of cores in the instruction processing stopped state is 3.

In both cases, it is desirable to perform control such that the power variation upon a plurality of cores concurrently returning to the instruction processing state from the instruction processing stopped state becomes less than or equal to the acceptable power difference and that the maximum amount of power saving is obtained in the instruction processing stopped state. That is, in the instruction processing stopped state, it is desirable to perform control such that the power consumption of the processor approaches, as much as possible, a power level that can ensure the acceptable power difference, regardless of the number of cores in the stopped state.

Figure 14:
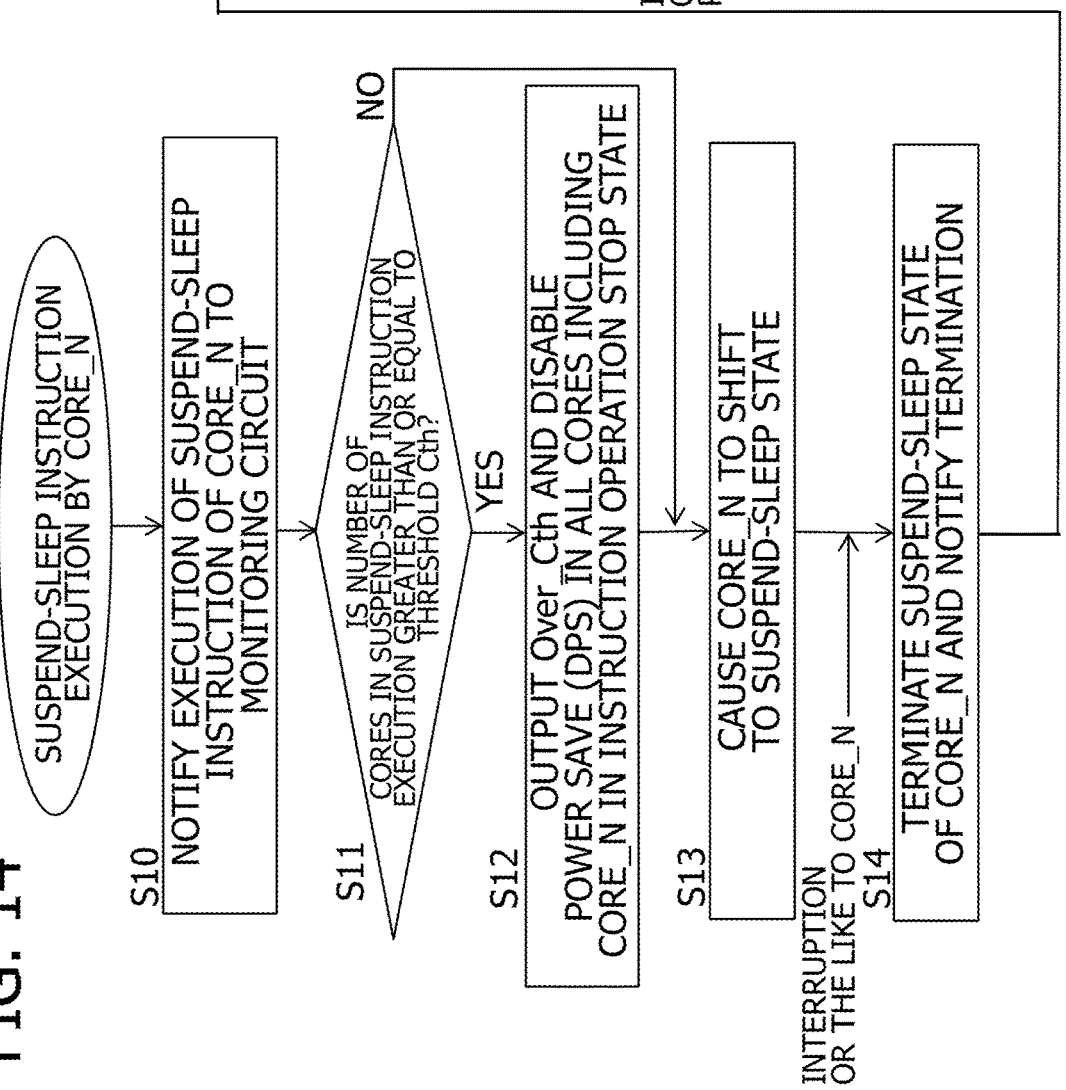
FIG. 14 is a flowchart diagram illustrating the operation of the monitoring circuit and the power control circuit of each core in the second embodiment.

FIG. 14 is a flowchart diagram illustrating the operation of the monitoring circuit and the power control circuit of each core in the second embodiment. For instance, suppose that the core CORE_N executes a suspend instruction or a sleep instruction to shift to the instruction processing stopped state. In that case, the power control circuit 15 of the core CORE_N notifies the monitoring circuit 13, with the signal S1_1, of the shift to the instruction processing stopped state caused by the execution of the suspend instruction or the sleep instruction (S10). In response, the counter 131 of the monitoring circuit 13 increases the count value CNT by 1, and the four comparators 132 respectively compare the count value CNT and the threshold core numbers Cth1 to Cth4 to set, in the case where the count value CNT indicating the number of cores in the instruction processing stopped state is greater than the respective threshold core numbers Cth1 to Cth4, the corresponding core number over signals Over_Cth1 to Over_Cth4 to H level (S11).

The power control circuit 15 of all cores including the core CORE_N sets some of the disable power save signals DPS1 to DPS5 to H level (disabled state) (S12), on the basis of the core number over signals Over_Cth1 to Over_Cth4. The core CORE_N shifts to the suspend state or the sleep state (S13). At this time, the internal circuits of the core CORE_N are all set to the power save state by the clock enable signal CLKEN at H level (power save state). However, the power save operation of some of the internal circuits is disabled by the disable power save signal DPS, and power is consumed.

Then, for instance, assume that an interruption occurs, and the core CORE_N is released from the suspended or sleep state. In response, the power control circuit 15 of the core CORE_N notifies the monitoring circuit 13 of the instruction stop termination signal S1_2 (S14). The counter of the monitoring circuit 13 decreases the count value CNT by 1, and the plurality of comparators respectively compare the count value CNT and the threshold core numbers Cth1 to Cth4 to set some of the core number over signals Over_Cth1 to Over_Cth4 to H level (S15). The power control circuit 15 of all cores sets some of the disable power save signals DPS1 to DPS5 to H level (disabled state) (S16), on the basis of the core number over signals Over_Cth1 to Over_Cth4.

Eventually, an interruption occurs in the processor, and all cores in the suspend state or the sleep state are released from the suspend state or the sleep state to return to the instruction processing state (S17). The power variation of a processor chip at this time falls within the acceptable power difference P_dPW, and malfunctioning due to power supply noise is prevented.

[Power Control Example 1 in Second Embodiment]

Figure 15:
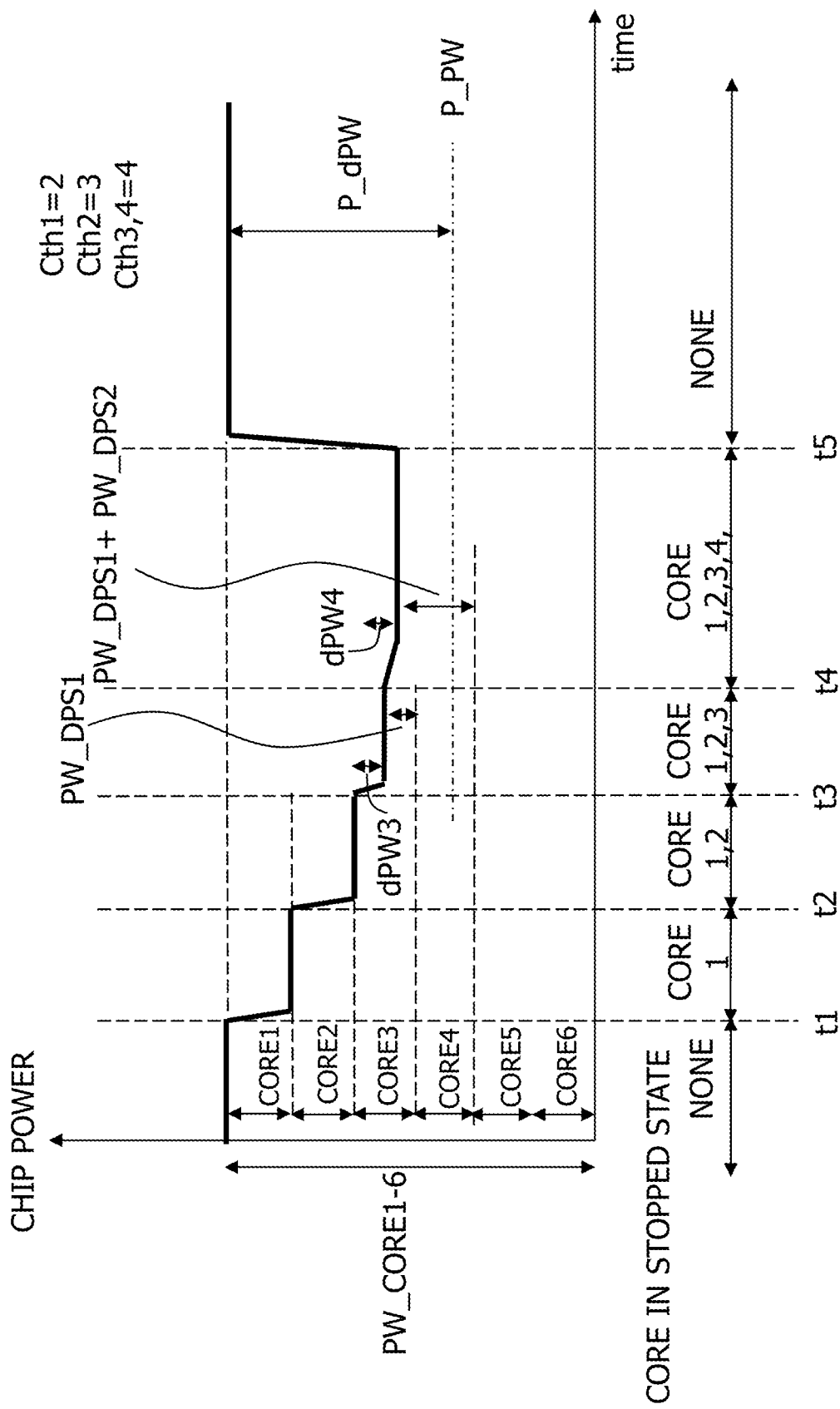
FIG. 15 is a diagram illustrating an example of power control of the processor in the second embodiment.

FIG. 15 is a diagram illustrating an example of power control of the processor in the second embodiment. In this example, suppose that the threshold core number Cth1 is configured to "2," Cth2 to "3," and Cth3 and Cth4 to "4," for instance.

First, at times t1 and t2, the cores CORE1 and CORE2 each shift to the instruction processing stopped state. In this case, the count values CNT of the counter 131 of the monitoring circuit 13 are "1" and "2" that are less than or equal to the two threshold core numbers. Thus, the comparator 132 maintains all core number over signals to L level. Therefore, the cores CORE1 and CORE2 are each set to the power save operation state, and the power consumption of the processor drops with a power variation corresponding to the amount of power saving of each of the cores CORE1 and CORE2.

Next, at time t3, the core CORE3 further shifts to the instruction processing stopped state. In this case, the count value CNT of the counter 131 of the monitoring circuit 13 is "3," exceeding the threshold core number Cth1, which equals 2. Therefore, the comparator 132 sets the core number over signal Over_Cth1 to H level. Therefore, in each of the cores CORE1, CORE2, and CORE3, the disable power save signal DPS1 is set to H level (disabled state). So, the cores CORE1, 2 and 3 shifts to the instruction processing stopped state in a state where one internal circuit is in the power save disable operation. As a result, an amount of change dPW3 in the power consumption of the processor becomes lower than the amount of change at times t1 and t2 when the cores CORE1 and CORE2 have shifted to the instruction processing stopped state, and the power consumption of the processor is maintained at a level higher than an acceptable power level P_PW corresponding to the acceptable power difference P_dPW.

Further, at time t4, the core CORE4 further shifts to the instruction processing stopped state. In this case, the count value CNT of the counter 131 of the monitoring circuit 13 is "4," exceeding the threshold core numbers Cth1, which equals 2, and Cth2, which equals 3. Therefore, the comparator 132 sets the core number over signals Over_Cth1 and Over_Cth2 to H level. Therefore, in each of the cores CORE1, CORE2, CORE3, and CORE4, the disable power save signals DPS1 and DPS2 are set to H level (disabled state). So, the cores CORE1, CORE2, CORE3, and CORE4 shift to the instruction processing stopped state in a state where two internal circuits are in the power save disable operation. As a result, an amount of change dPW4 in electrical energy of the processor is lower than the amount of change at times t1 and t2 and lower than the amount of change dPW3 at time t3, and the power consumption of the processor is maintained at a level higher than the acceptable power level P_PW corresponding to the acceptable power difference P_dPW.

In this manner in the second embodiment, as the number of cores in the instruction processing stopped state increases the number of internal circuits in the power save disabled state within the cores increases. Thus, the power consumption of the processor is maintained at a level higher than but close to the acceptable power level P_PW corresponding to the acceptable power difference P_dPW.

At time t5, an interruption occurs in the processor, and all of the cores CORE1 to CORE4 in the instruction processing stopped state concurrently shift to the instruction processing state. The amount of power variation of the processor at this time is moderated to within the acceptable power difference P_dPW, and the power supply noise is moderated.

With the second embodiment, as described above, a drop in power of the processor, in the case where the cores transition to the instruction processing stopped state one after another, is a steep drop at first, but the drop rate gradually decreases after the number of cores in the stopped state has exceeded the threshold. Therefore, the power consumption of the processor gradually approaches the power level P_PW corresponding to the acceptable power difference P_dPW.

[Power Control Example 2 in Second Embodiment]

Figure 16:
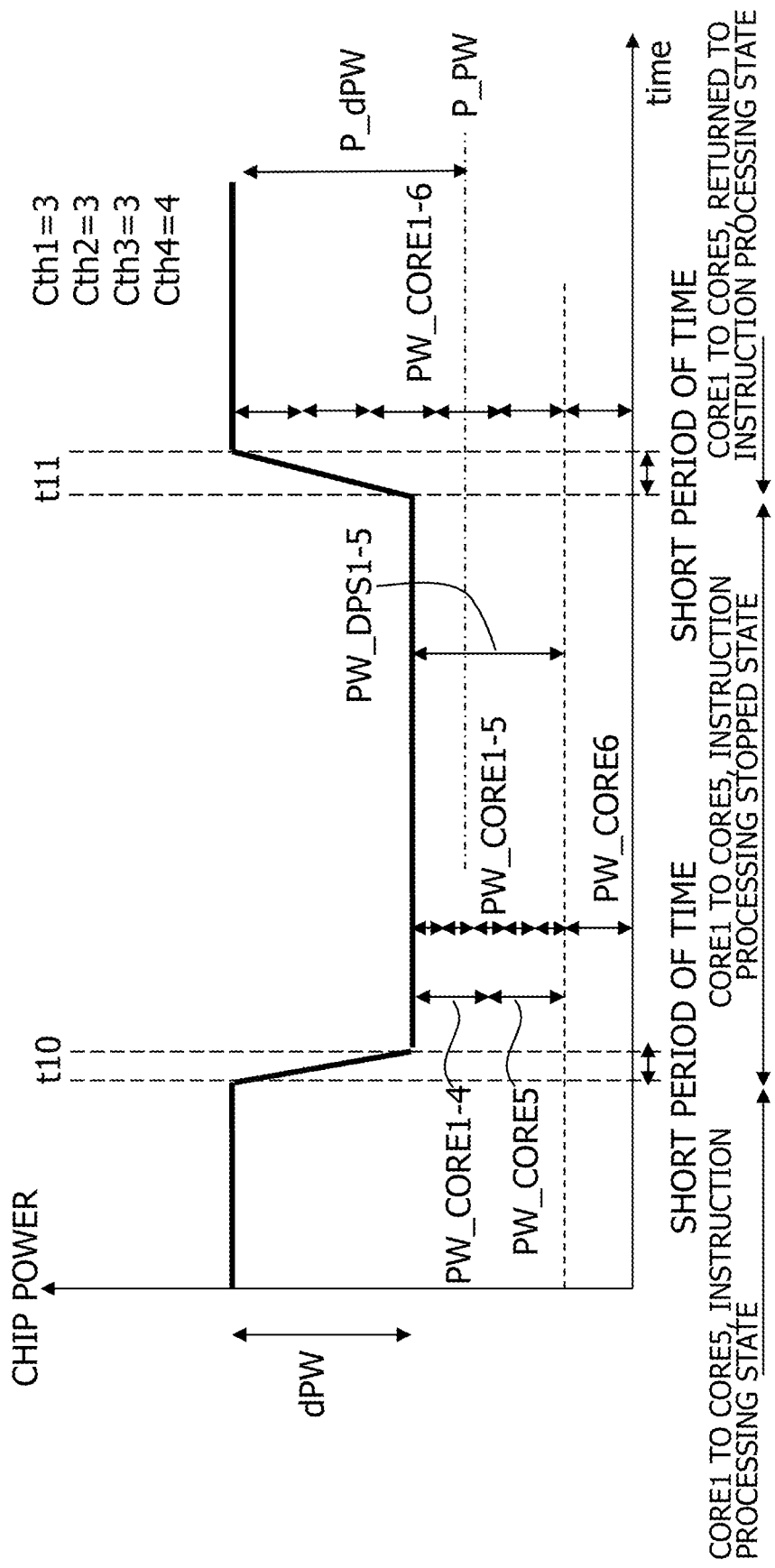
FIG. 16 is a diagram illustrating another example of power control of the processor in the second embodiment.

FIG. 16 is a diagram illustrating another example of power control of the processor in the second embodiment. In this example, the threshold core number Cth1 is configured to equal 3, Cth2 to equal 3, Cth3 to equal 3, and Cth4 to equal 4, for instance.

Assume that, at time t10, the four cores CORE1 to CORE4 have shifted to the instruction processing stopped state in a predetermined short period of time. In this case, the count value CNT of the monitoring circuit 13 satisfies CNT=4 and exceeds the threshold core numbers Cth1 to Cth3, which equal 3. Thus, the DPS signal generation circuit of FIG. 13 sets DPS1 to DPS3 to H level, and three internal circuits within the four cores CORE1 to CORE4 are set to the power save disabled state. As a result, power consumption PW_CORE1-4 (PW_DPS1-3) of the four cores CORE1 to CORE4 is greater than of the power save state, and the power consumption level (PW_CORE1-4 (PW_DPS1-3)+ PW_CORE5+PW_CORE6) of the processor is maintained at a level higher than the acceptable power level P_PW corresponding to the acceptable power difference P_dPW.

Assume that, at time t10, the five cores CORE1 to CORE5 have shifted to the instruction processing stopped state in a short period of time. In this case, the count value CNT of the monitoring circuit 13 satisfies CNT=5 and exceeds the threshold core numbers Cth1 to Cth3, which equal 3, and Cth4, which equals 4. Thus, the DPS signal generation circuit of FIG. 13 sets DPS1 to DPS4 to H level, and four internal circuits within the five cores CORE1 to CORE5 are set to the power save disabled state. As a result, power consumption PW_CORE1-5 (PW_DPS1-4) of the five cores CORE1 to CORE5 is greater than of the power save state, and the power consumption level (PW_CORE1-5 (PW_DPS1-4)+PW_CORE6) of the processor is maintained at a level higher than the acceptable power level P_PW corresponding to the acceptable power difference P_dPW.

Thus, the power variation upon all cores returning to the instruction processing state at time t11 is moderated to within the acceptable power difference P_dPW.

With the second embodiment, as described above, an increase in the number of cores in the instruction processing stopped state causes an increase also in the number of internal circuits in the power save disabled state within those cores. Thus, the processor controls the power consumption to gradually approach the acceptable power level P_PW corresponding to the acceptable power difference P_dPW as much as possible, and the power variation upon all cores returning to the instruction processing state is moderated to within the acceptable power difference P_dPW.

Third Embodiment

In the processor in the second embodiment, as illustrated in FIG. 12, the monitoring circuit 13 shared by the plurality of cores includes the threshold core number register 133 and the comparator 132, the threshold core number that is common with respect to all cores is configured in the threshold core number register 133, and the core number over signal Over_Cth that is a result of comparison by the common comparator is output to all cores.

However, in a processor in a third embodiment, a monitoring circuit includes a core number counter, and a power control circuit of each core includes a plurality of threshold core number registers and a plurality of comparators that compare a count value of the core number counter and a threshold core number to output a core number over signal when the count value exceeds the threshold core number. The power control circuit of each core in the instruction processing stopped state disables the power save operation of the internal circuit therein in accordance with the core number over signal. Accordingly, each core can configure the threshold core number separately to perform optimal control of power save disabling in accordance with the configuration of an internal circuit of each core.

Figure 17:
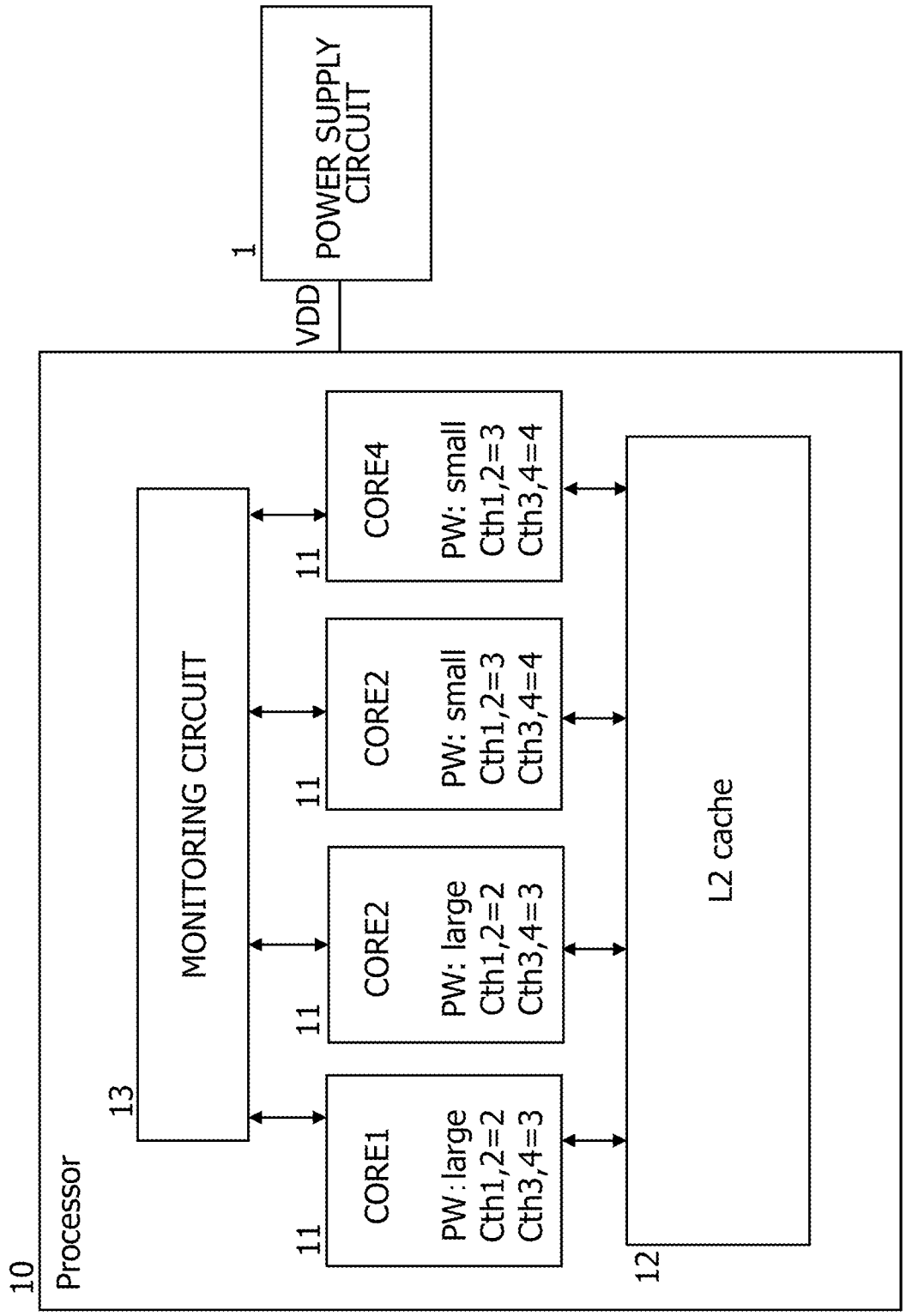
FIG. 17 is a diagram illustrating the configuration of the processor in the third embodiment.

FIG. 17 is a diagram illustrating the configuration of the processor in the third embodiment. In FIG. 17, unlike in FIG. 10, the threshold core numbers are configured such that Cth1 and Cth2 equal 2 and that Cth3 and Cth4 equal 3 in the cores CORE1 and CORE2 that is great power consumption to perform control of power save disabling even at a stage in which the number of cores in the instruction processing stopped state is low. Meanwhile, the threshold core numbers are configured such that Cth1 and Cth2 equal 3 and that Cth3 and Cth4 equal 4 in the cores CORE3 and CORE4 that is low power consumption to perform control of power save disabling after the number of cores in the instruction processing stopped state has become great.

Figure 18:
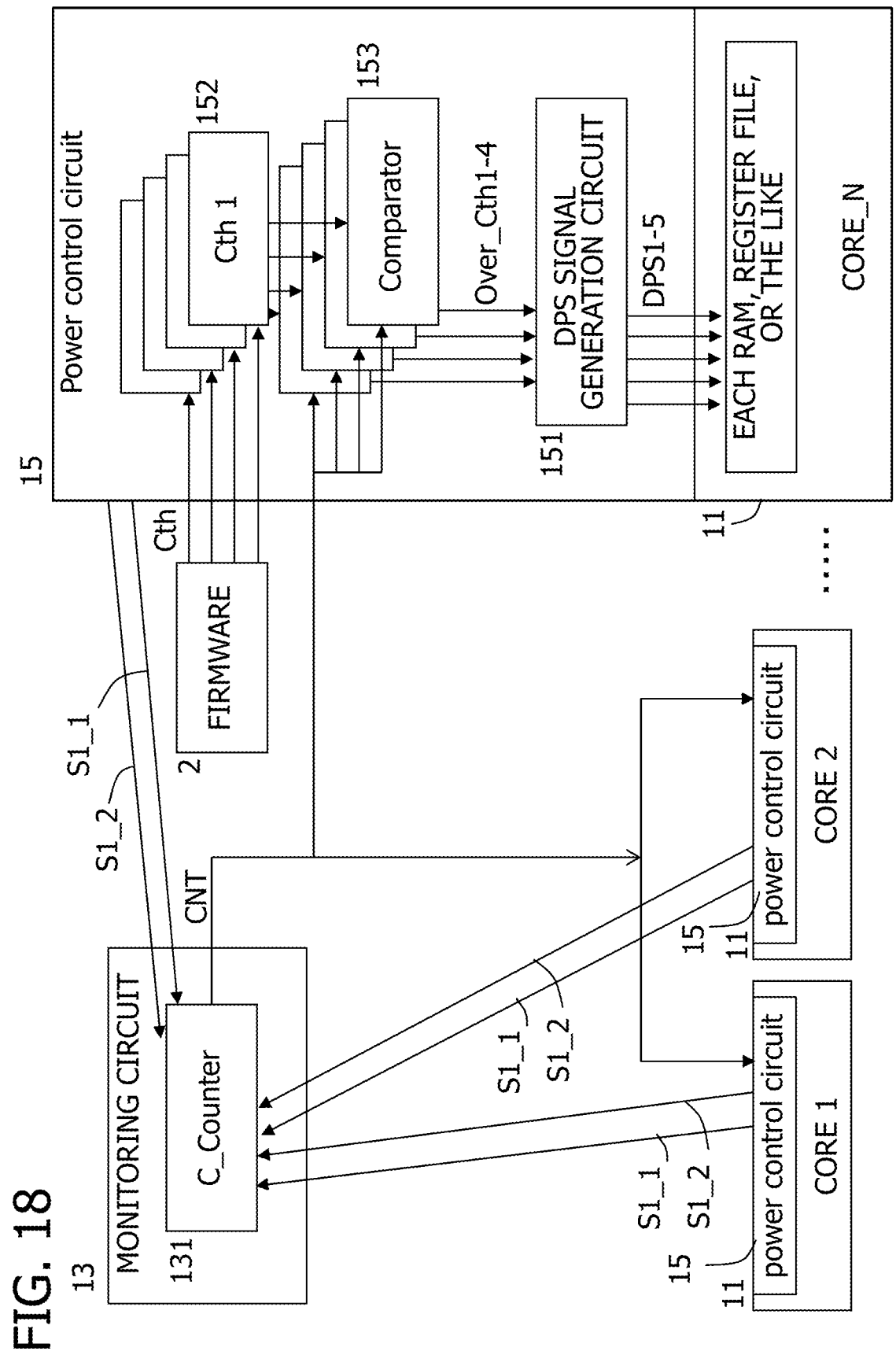
FIG. 18 is a configuration diagram of the monitoring circuit and the power control circuit in the third embodiment.

FIG. 18 is a configuration diagram of the monitoring circuit and the power control circuit in the third embodiment. In FIG. 18, the number of cores is N. The configuration of only the power control circuit 15 of the core CORE_N is illustrated. The monitoring circuit 13 of FIG. 18 includes the counter 131 that counts number of cores in the instruction processing stopped state. Meanwhile, the power control circuit 15 of each core includes a plurality of threshold core number registers 152 and a plurality of comparators 153 that compare the count value CNT of the core number counter and the threshold core numbers Cth1 to Cth4 to output the core number over signals Over_Cth1 to Over_Cth4 when the count value exceeds the threshold core number. The DPS signal generation circuit 151 generates the disable power save signals DPS1 to DPS5 that disable the power save operation of the internal circuits of the core in the instruction processing stopped state in accordance with the core number over signals Over_Cth1 to Over_Cth4. The comparator 153 and the DPS signal generation circuit 151 are the same as those in the second embodiment. The DPS signal generation circuit 151 includes a configuration identical to that of FIG. 13, for instance.

The processor of the third embodiment can configure, in each core, a threshold core number optimal for the configuration and thus performs a more flexible control of power save disabling.

Fourth Embodiment

In a fourth embodiment, a processor performs control such that a threshold core number increases after a predetermined time has passed since a core has shifted to the instruction processing stopped state from the instruction processing state and that the threshold core number decreases a predetermined time before a return to the instruction processing state. As such, a monitoring circuit includes a timer to monitor the predetermined time described above.

Figure 19:
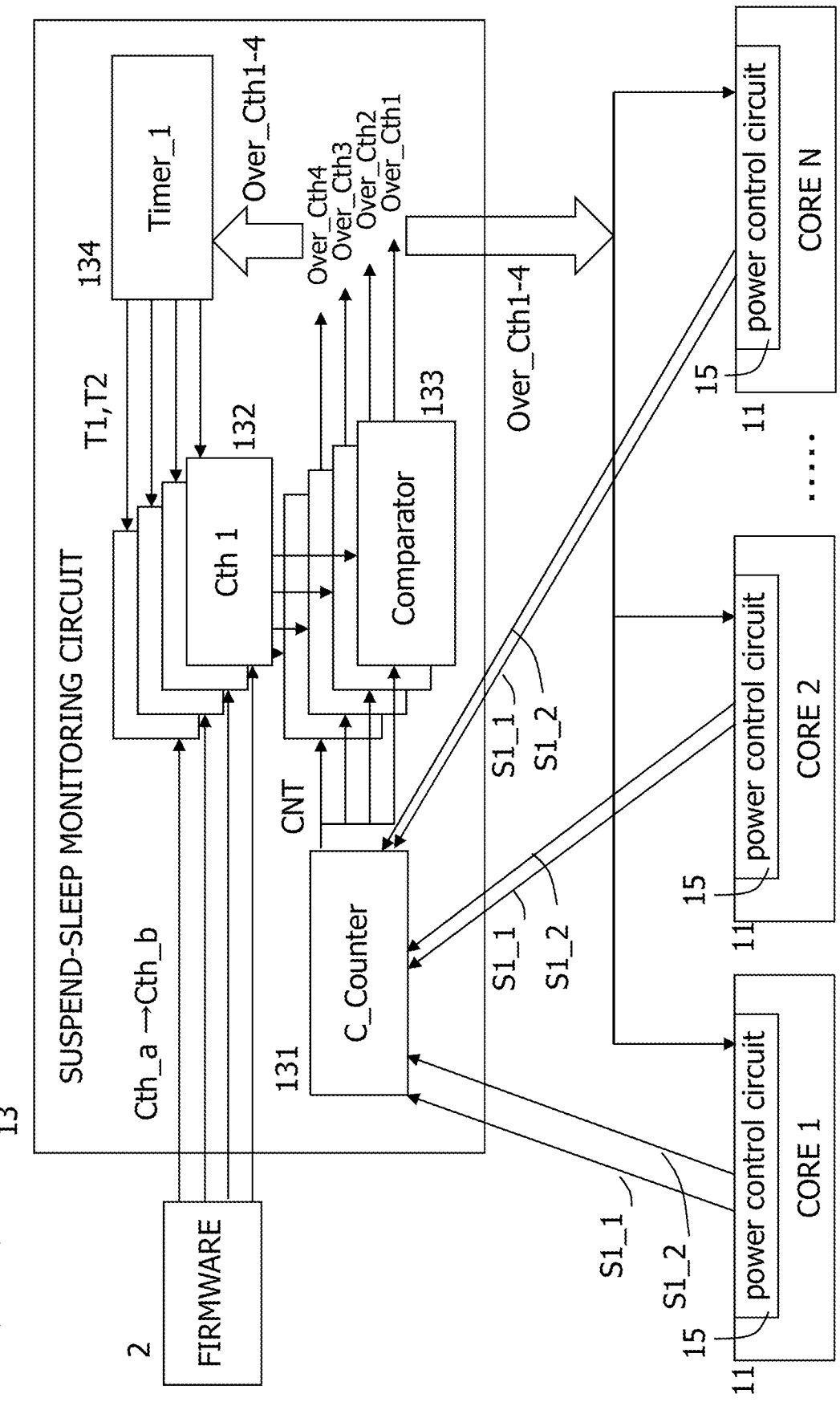
FIG. 19 is a diagram illustrating the configuration of the monitoring circuit in the fourth embodiment.

FIG. 19 is a diagram illustrating the configuration of the monitoring circuit in the fourth embodiment. The difference in configuration of the monitoring circuit of FIG. 19 from the monitoring circuit of FIG. 12 is a timer 134 that outputs a trigger signal to change the configuration in a threshold core number register 132 after a predetermined time T1 has passed, in response to the core number over signals Over_Cth1 to Over_Cth4 generated by a comparator 133. The timer 134 outputs a trigger signal to the threshold core number register 132 at a timing of a predetermined time T2 before the core returns to the instruction processing state.

Figure 20:
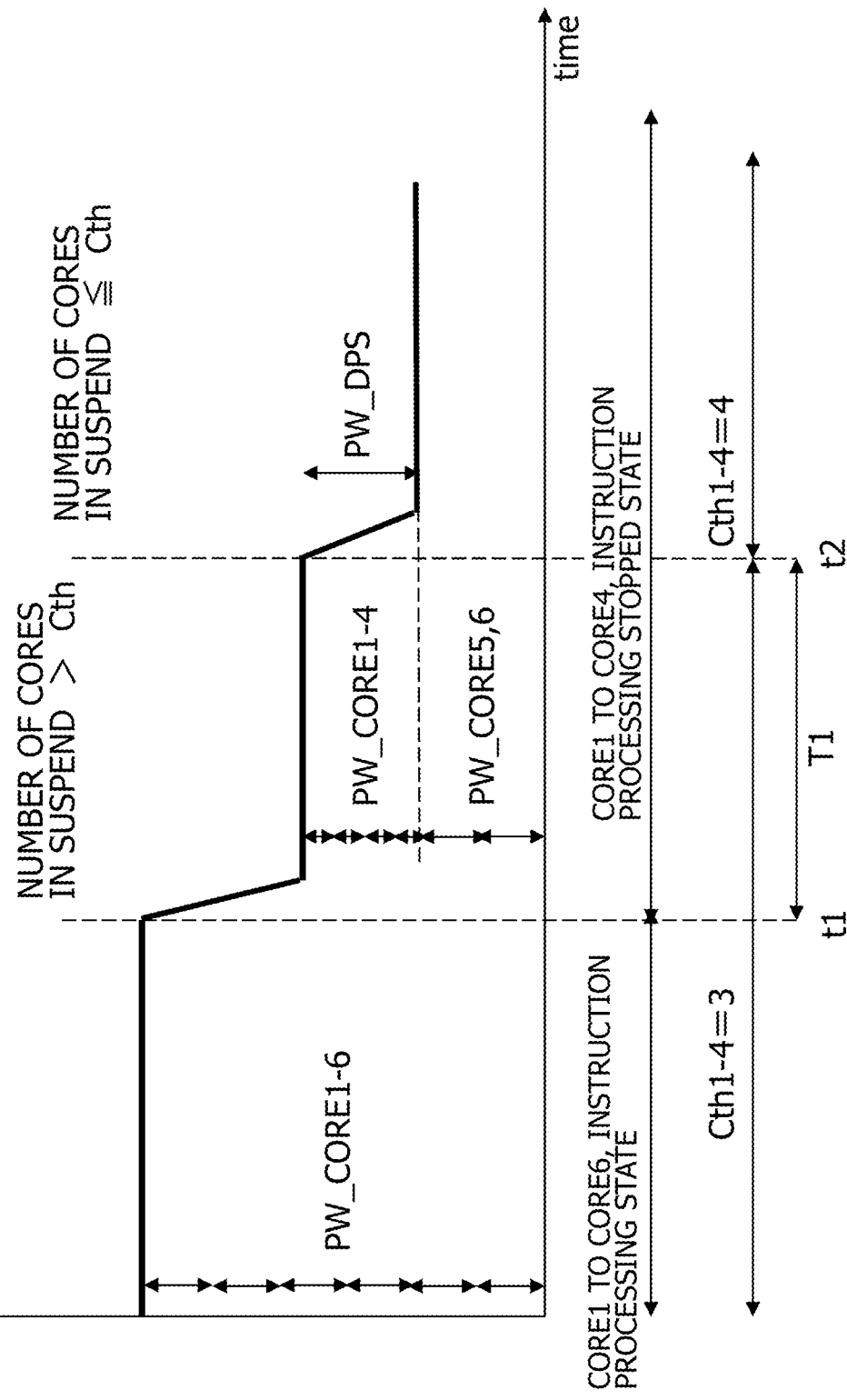
FIG. 20 is a diagram illustrating power control upon the core shifting to the instruction processing stopped state from the instruction processing state in the fourth embodiment.

FIG. 20 is a diagram illustrating power control upon the core shifting to the instruction processing stopped state from the instruction processing state in the fourth embodiment. In this example, the four threshold core numbers Cth1 to Cth4 are all configured to "3," and the configurations of the threshold core numbers Cth1 to Cth4 are all changed to "4" at t2 after the predetermined time T1 has passed since the shift to the instruction processing stopped state at t1. At time t1, the four cores CORE1 to CORE4 shift to the instruction processing stopped state within a short period of time.

At time t1, the four cores CORE1 to CORE4 shift to the instruction processing stopped state approximately at the same time. Accordingly, the counter 131 of the monitoring circuit 13 outputs that the count value CNT equals 4, and the comparator 133 sets all of the core number over signals Over_Cth1 to Over_Cth4 to H level. The power control circuit 15 of the cores CORE1 to CORE4 in the instruction processing stopped state sets all of the disable power save signals DPS1 to DPS4 to H level to set four internal circuits to the power save disabled state. Then, the cores CORE1 to CORE4 shift to the instruction processing stopped state. As a result, out of the six cores within the processor, the cores CORE1 to CORE4 are set to the power save disabled state, and a drop in power of the power consumption PW_CORE1-4 is limited. At the same time, the timer 134 monitors the passing of the predetermined time T1 since time t1.

At time t2 that is the predetermined time T1 after time t1, the timer 134 outputs a trigger signal. In response, the threshold core number register 132 changes the threshold core numbers Cth1 to Cth4 from "3" to "4." In response, the comparator 133 sets all of the core number over signals Over_Cth1 to Over_Cth4 to L level. The power control circuit 15 of the cores CORE1 to CORE4 sets all of the disable power save signals DPS1 to DPS4 to L level to set four internal circuits in the cores to the power save state. As a result, out of the six cores within the processor, the cores CORE1 to CORE4 are set to the power save state, the power consumption of the processor further drops to the power consumption of the cores CORE5 and CORE6 in the instruction processing state. Accordingly, a decrease in power consumption of the processor upon the four cores CORE1 to CORE4 shifting to the instruction processing stopped state approximately at the same time is shaped in the two steps at t1, t2 so as to be moderated to within an acceptable power difference.

Figure 21:
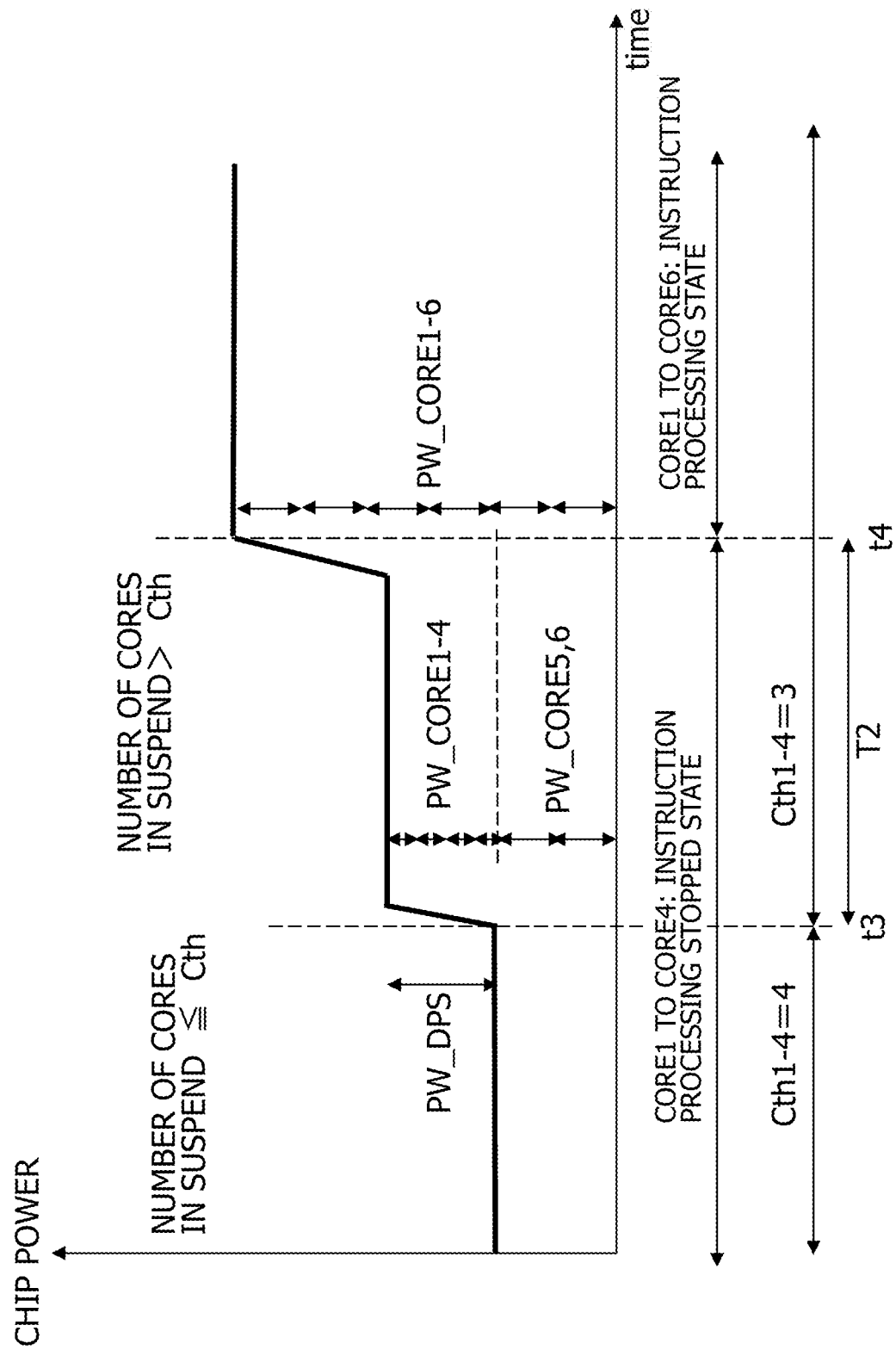
FIG. 21 is a diagram illustrating power control upon the core shifting to the instruction processing state from the instruction processing stopped state in the fourth embodiment.

FIG. 21 is a diagram illustrating power control upon the core shifting to the instruction processing state from the instruction processing stopped state in the fourth embodiment. In this example, the four threshold core numbers Cth1 to Cth4 are all configured to "4" in the instruction processing stopped state, and the threshold core numbers Cth1 to Cth4 are all changed to "3" at time t3 that is the predetermined time T2 before time t4 at which returning to the instruction processing state. It is the power control at the time of return to the instruction processing state from the instruction processing stopped state of FIG. 20.

First, the timer 134 monitors the passing of a time that is shorter by the predetermined time T2 than an instruction processing stopped period, since time t1 of FIG. 20. That is, the timer 134 monitors the arrival of time t3 that is the predetermined time T2 before time t4 at which the four cores CORE1 to CORE4 return to the instruction processing state. For instance, in the case of a pause instruction, a user program specifies a time of the pause state, and thus the instruction processing stopped period described above is made clear in advance.

Since the threshold core numbers Cth1 to Cth4 are configured to "4" before time t3, the comparator 133 of the monitoring circuit 13 sets all of the core number over signals Over_Cth1 to Over_Cth4 to L level. Thus, before time t3, the cores CORE1 to CORE4 in the instruction processing stopped state are in the power save state.

Next, at time t3, a trigger signal (not illustrated) of the timer 134 causes the threshold core number register 132 to change the configurations of the four threshold core numbers Cth1 to Cth4 to "3." In response, the comparator 133 of the monitoring circuit 13 sets all of the core number over signals Over_Cth1 to Over_Cth4 to H level. The power control circuit 15 of the cores CORE1 to CORE4 in the instruction processing stopped state sets all of the disable power save signals DPS1 to DPS4 to H level to set four internal circuits to the power save disabled state. As a result, the power consumption of the processor rises by the power PW_DPS (which equals PW_CORE1-4) of the four cores CORE1 to CORE4 in the power save disabled state at time t3.

Further, at time t4 after the predetermined time T2 has passed since time t3, the four cores CORE1 to CORE4 output the stop termination signal S1_2 to the monitoring circuit 13, and the counter 131 sets the count value CNT to "0." Accordingly, the comparator 133 of the monitoring circuit 13 sets the core number over signals Over_Cth1 to Over_Cth4 to L level. However, since the four cores CORE1 to CORE4 transition to the instruction processing state, the clock enable signal CLKEN of each internal circuit is set to H level (clock enabled state), causing a state of power consumption in normal operation.

The degree of variation in power consumption of the processor at time t3 and the degree of variation in power consumption of the processor at time t4 are each less than or equal to the acceptable power difference, and the power supply noise is moderated to less than or equal to an acceptable value.

With the fourth embodiment, as described above, the processor increases the threshold core number Cth to thereby decrease the power consumption in two stages, in the case where the core transitions to the instruction processing stopped state, and decreases the threshold core number Cth to thereby increase the power consumption in two stages, in the case where the core returns to the instruction processing state. In this manner, by controlling the configuration of the threshold core number, the processor moderates the degree of variation in power consumption of the entire processor to less than or equal to the acceptable power difference and moderates the power supply noise.

Fifth Embodiment

In the second embodiment, in order to moderate the degree of variation in power consumption of the entire processor to less than or equal to the acceptable power difference, the number of cores that transition to the instruction processing stopped state within the processor is monitored. When the number of cores exceeds the threshold core number, the number of internal circuits within the core in the instruction processing stopped state that are controlled to the power save disabled state is in accordance with the number of cores in the instruction processing stopped state.

In contrast, a fifth embodiment includes, in addition to the configuration of the second embodiment, a configuration in which the degree of change in power consumption of each core in the case where the core transitions to the instruction processing stopped state is controlled in stages. This control is described also in Japanese Patent Application Laid-open No. 2013-205905 mentioned earlier, for instance. Therefore, the power control circuit of the core controls all of the plurality of internal circuits within the core that shifts to the instruction processing stopped state to the power save disabled state at first and gradually causes the internal circuits to transition to the power save state.

Figure 22:
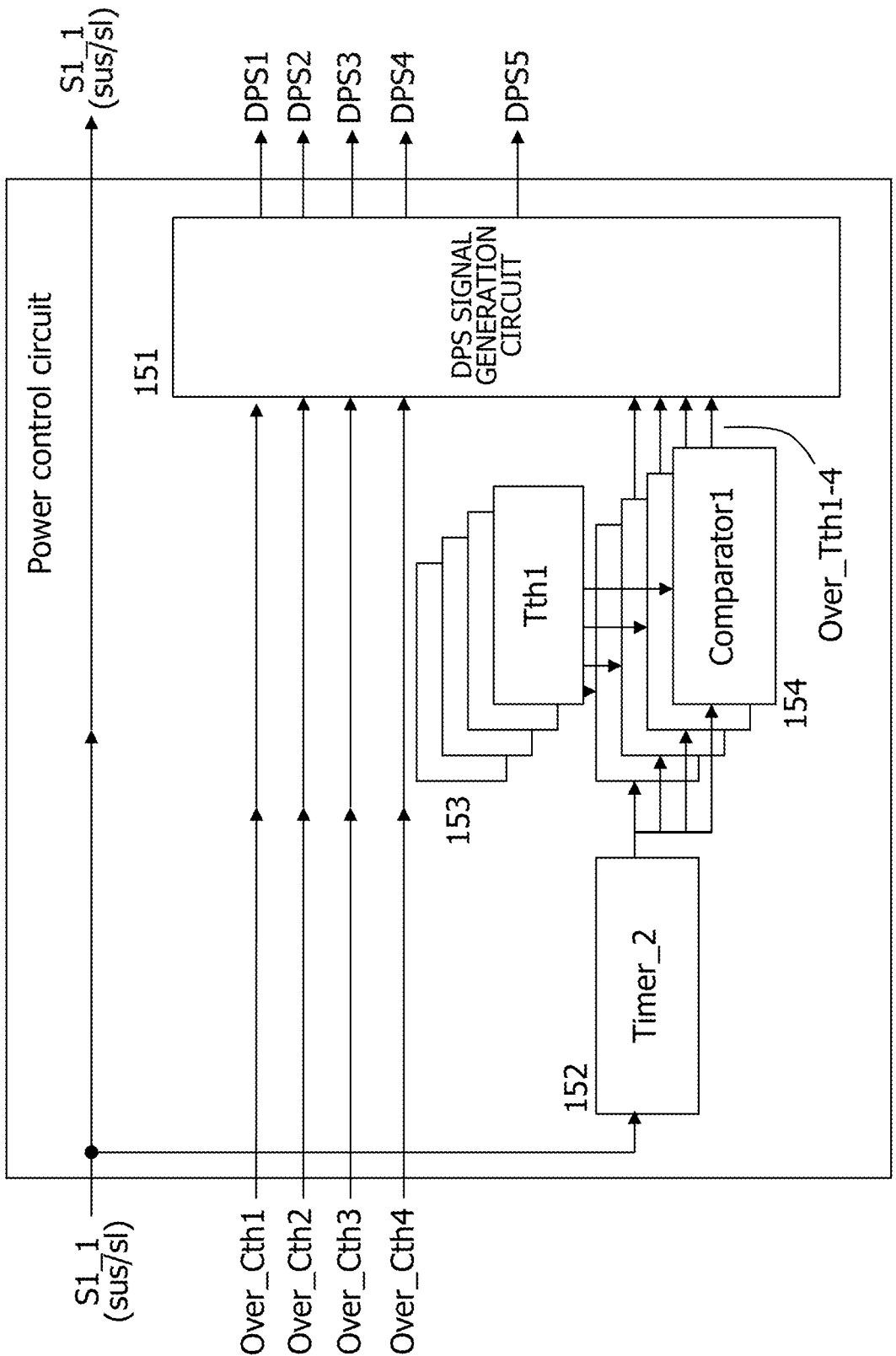
FIG. 22 is a diagram illustrating the configuration of the power control circuit 15 in the fifth embodiment.

FIG. 22 is a diagram illustrating the configuration of the power control circuit 15 in the fifth embodiment. In a same manner to FIG. 13, the power control circuit 15 transfers the instruction processing stop signal S1_1 from the instruction control circuit 110 of the internal circuit to the counter 131 of the monitoring circuit 13. Further, unlike in FIG. 13, the power control circuit 15 includes a timer 152 that measures a time from when the instruction processing stop signal S1_1 has changed to H, four threshold time registers 153 that configure threshold times Tth1 to Tth4 that are times at which the internal circuits transition to the power save state in order, and four comparators 154 that respectively compare the time of the timer 152 and the four threshold times Tth1 to Tth4. The four comparators 154 output time over signals Over_Tth1 to Over_Tth4, when the time of the timer exceeds the threshold times Tth1 to Tth4. The DPS signal generation circuit 151 generates the disable power save signals DPS1 to DPS5, on the basis of the core number over signals Over_Cth1 to Over_Cth4 and the time over signals Over_Tth1 to Over_Tth4.

Figure 23:
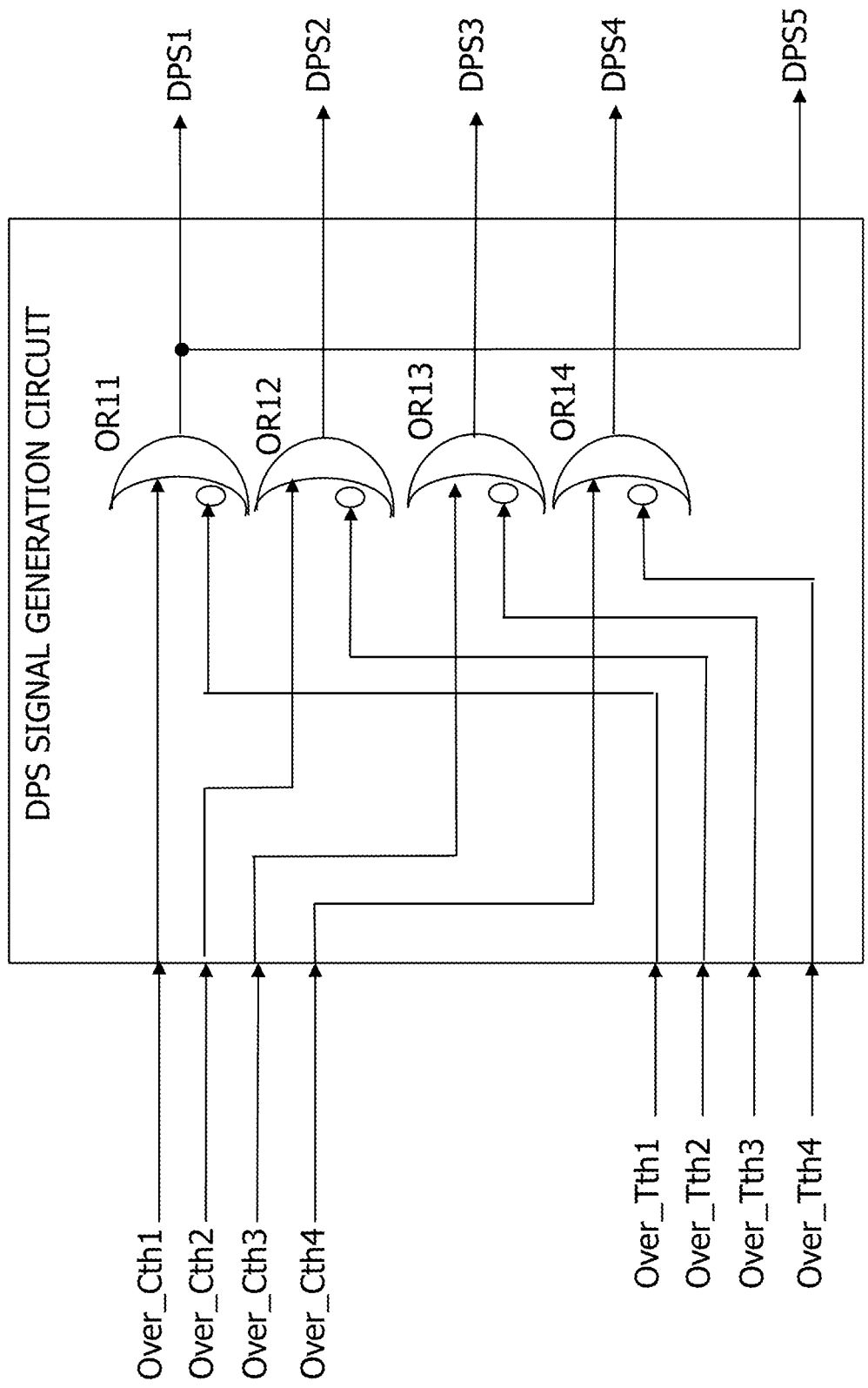
FIG. 23 is a diagram illustrating a configuration example of the DPS signal generation circuit in the fifth embodiment.

FIG. 23 is a diagram illustrating a configuration example of the DPS signal generation circuit in the fifth embodiment. The DPS signal generation circuit 151 includes an OR circuit OR11 that is input with the core number over signal Over_Cth1 and an inverted signal of the time over signal Over_Tth1 to output the disable power save signal DPS1. In a same manner, there are included OR circuits OR12, OR13, and OR14, the OR circuits OR12 to OR14 being respectively input with the core number over signals Over_Cth2 to Over_Cth4 and inverted signals of the time over signals Over_Tth2 to Over_Tth4 to respectively output the disable power save signals DPS2 to DPS4. In the example of FIG. 23, the disable power save signal DPS5 is generated by the OR circuit OR11. Note that the disable power save signal DPS5 may be generated by another OR circuit.

Figure 24:
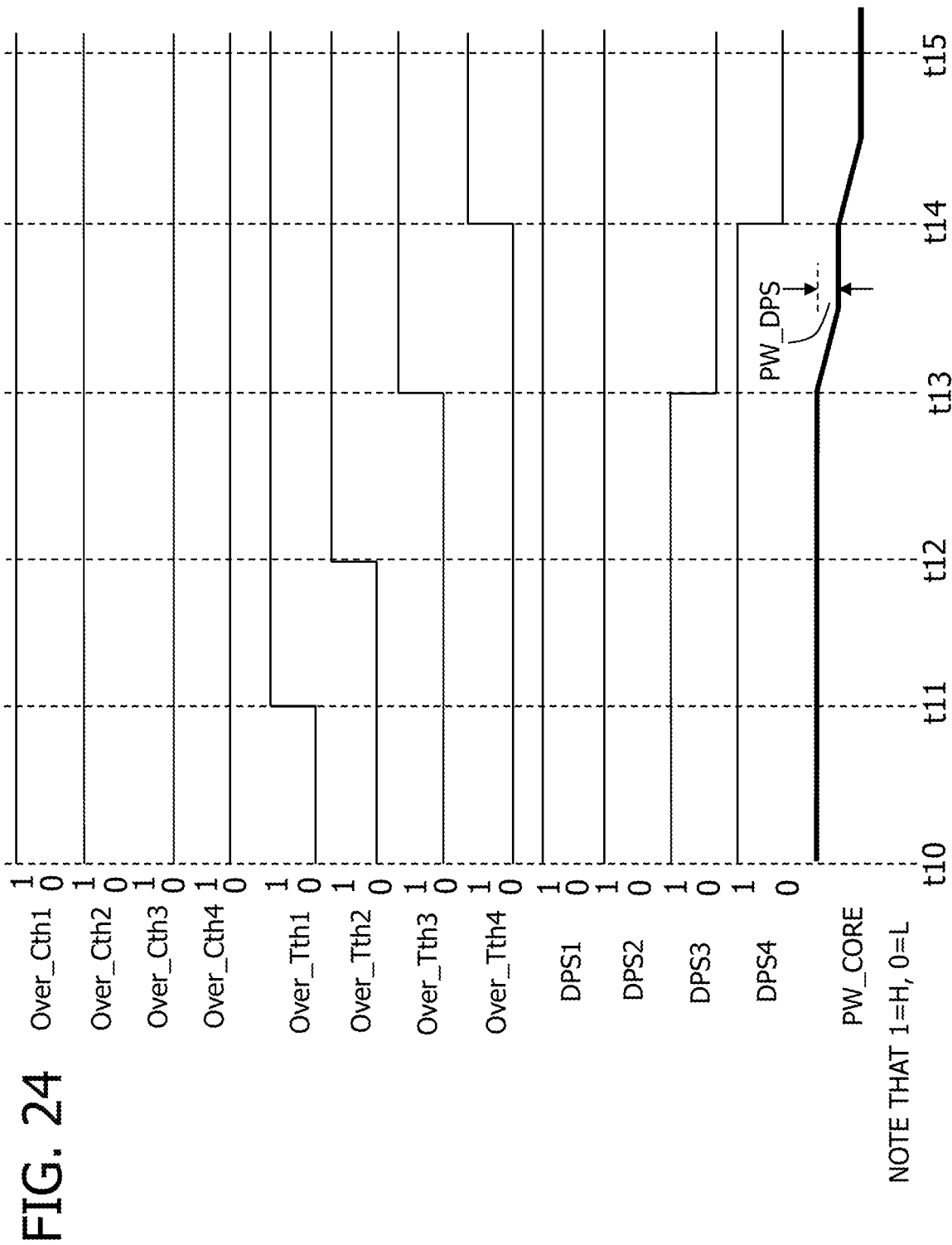
FIG. 24 is a timing diagram illustrating the operations of the power control circuit 15 and the DPS signal generation circuit 151 in FIGS. 22 and 23.

FIG. 24 is a timing diagram illustrating the operations of the power control circuit 15 and the DPS signal generation circuit 151 in FIGS. 22 and 23. The four threshold times Tth1 to Tth4 of FIG. 22 are configured as times t11, t12, t13, t14 in FIG. 24 such that t11<t12<t13<t14, for instance. Suppose that the core number over signals Over_Cth1 to Over_Cth4 supplied from the monitoring circuit 13 are such that the core number over signals Over_Cth1 and Over_Cth2 are at H level and the other signals Over_Cth3 and Over_Cth4 are at L level. In this case, with the DPS signal generation circuit 151, the disable power save signals DPS1 and DPS2 are maintained at H level (power save disabled state), while all of the other disable power save signals DPS3 and DPS4 are set to H level at first, but changed to L level in order as the timer 152 measures the passing of times t11 to t14 since time t10. Accordingly, in the case where each core transitions to the instruction processing stopped state, the other internal circuits, excluding the internal circuits controlled to the power save disabled state by the disable power save signals DPS1, DPS2 and DPS5 at H level, shift to the power save state from the power save disabled state in order by DPS3 and DPS4, and the power consumption of the core gradually drops.

In FIG. 24, at time t10, the core number over signals Over_Cth1 to Over_Cth4 are at H, H, L, and L levels, and the time over signals Over_Tth1 to Over_Tth4 are all at L level. At time t11, the timer 152 outputs time t11, and the comparator 154 changes the time over signal Over_Tth1 to H level. However, since the core number over signal Over_Cth1 is at H level, the OR circuit OR11 maintains H level (power save disabled state) of the disable power save signal DPS1. Therefore, power consumption PW_CORE of the core does not drop at time t11.

Next, at time t12, the timer 152 outputs time t12, and the comparator 154 changes the time over signal Over_Tth2 to H level. However, since the core number over signal Over_Cth2 is at H level, the OR circuit OR12 maintains H level of the disable power save signal DPS2. Therefore, the power consumption PW_CORE of the core does not drop also at time t12.

Next, at time t13, the timer 152 outputs time t13, and the comparator 154 changes the time over signal Over_Tth3 to H level. Since the core number over signal Over_Cth3 is at L level, the OR circuit OR13 changes the disable power save signal DPS3 to L level. Therefore, the power consumption PW_CORE of the core drops by the amount of power saving PW_DPS of the internal circuit corresponding to the signal DPS3 at time t13.

At time 14, in a same manner, the power consumption PW_CORE of the core drops by the amount of power saving PW_DPS of the internal circuit corresponding to the signal DPS4 at time t14. That is, the power consumption of the core drops in two stages at times t13 and t14.

Note that, in the case where the number of cores in the instruction processing stopped state does not exceed a threshold core number, the core number over signals Over_Cth1 to Over_Cth4 are all at L level, and thus the power consumption of the core that transitions newly to the instruction processing stopped state drops in four stages. That is, the state with all DPS=H shifts to the state with all DPS=L in four stages.

Figure 25:
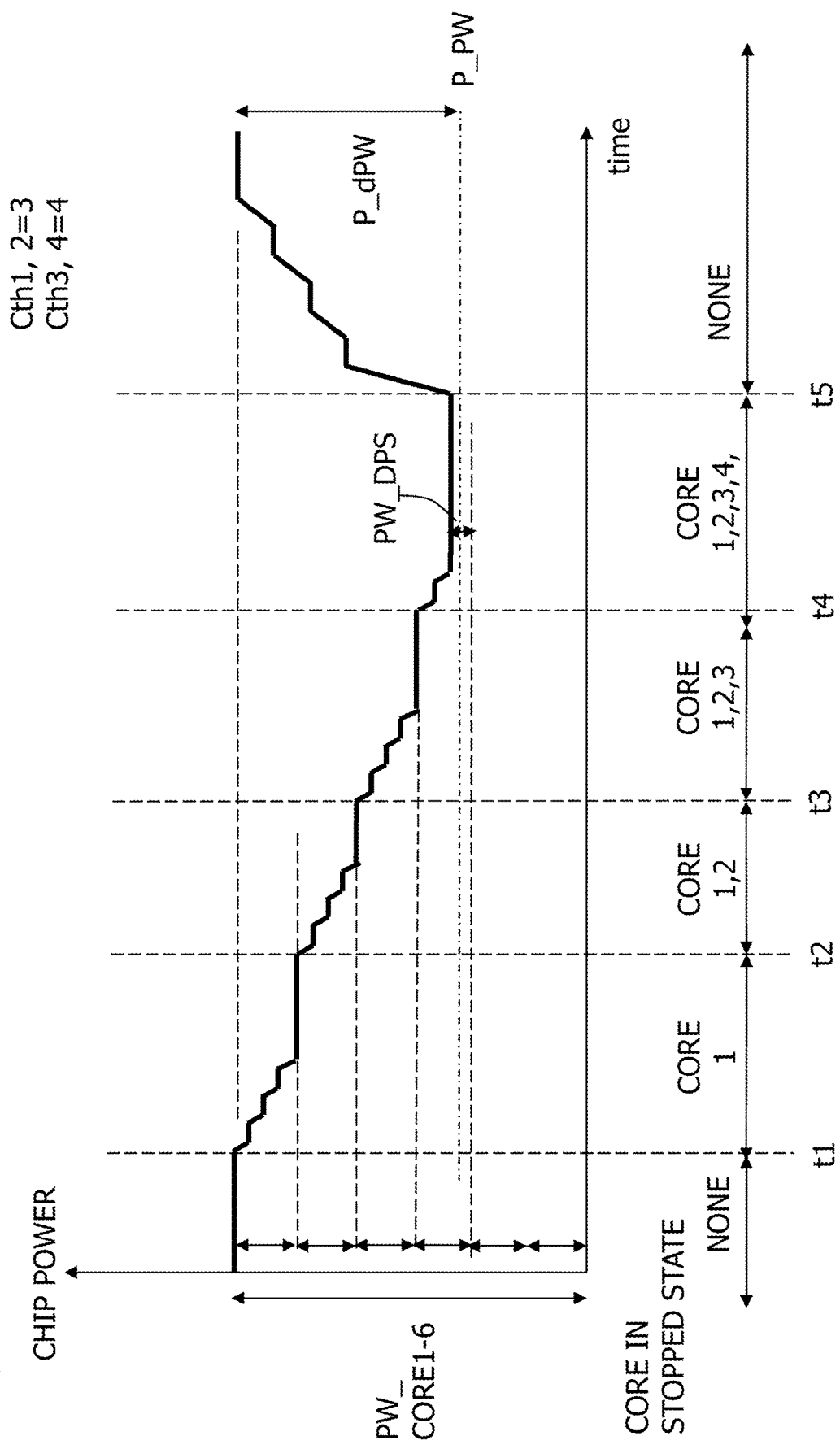
FIG. 25 is a diagram illustrating the variation in power consumption of the entire processor in the fifth embodiment.

FIG. 25 is a diagram illustrating the variation in power consumption of the entire processor in the fifth embodiment. In FIG. 25, a drop in power consumption of each core of FIG. 24 is applied to a drop in power consumption of the entire processor of FIG. 15. Assume that, in FIG. 25, the threshold core numbers Cth1 and Cth2 are configured to "3," and Cth3 and Cth4 to "4." Therefore, at times t1, t2, and t3, the power consumption of the respective cores drops in four stages. However, when the number of cores in the instruction processing stopped state is set to 4 at time t4, the core number over signals Over_Cth1 and Over_Cth2 are set to H level, and the power consumption of the cores drops in two stages.

In FIG. 25, the core CORE1 is set to the instruction processing stopped state at time t1, and the power consumption of the core CORE1 drops in four stages. In a same manner, the cores CORE2 and CORE3 are set to the instruction processing stopped state in order at times t2 and t3, and the power consumption of the cores CORE2 and CORE3 drops in four stages.

Next, at time t4, the core CORE4 is set to the instruction processing stopped state. Therefore, the count value CNT of the counter of the monitoring circuit 13 is set to "4" to exceed "3" of the threshold core numbers Cth1 and Cth2, and the comparator sets the core number over signals Over_Cth1 and Over_Cth2 to H level. For the core CORE4 that transitions newly to the instruction processing stopped state, as illustrated in FIG. 24, the power consumption drops in two stages. At the same time, the disable power save signals DPS1 and DPS2 of the cores CORE1 to CORE3 that have already transitioned to the instruction processing stopped state are set to H level, and therefore the power consumption of the cores CORE1 to CORE3 increases. As a result, in FIG. 25, two internal circuits of the cores CORE1 to CORE4 in the instruction processing stopped state are set to the power save disabled state, and the remaining internal circuits to the power save. The power consumption of the entire processor is controlled to greater than or equal to the acceptable power level P_PW.

Figure 26:
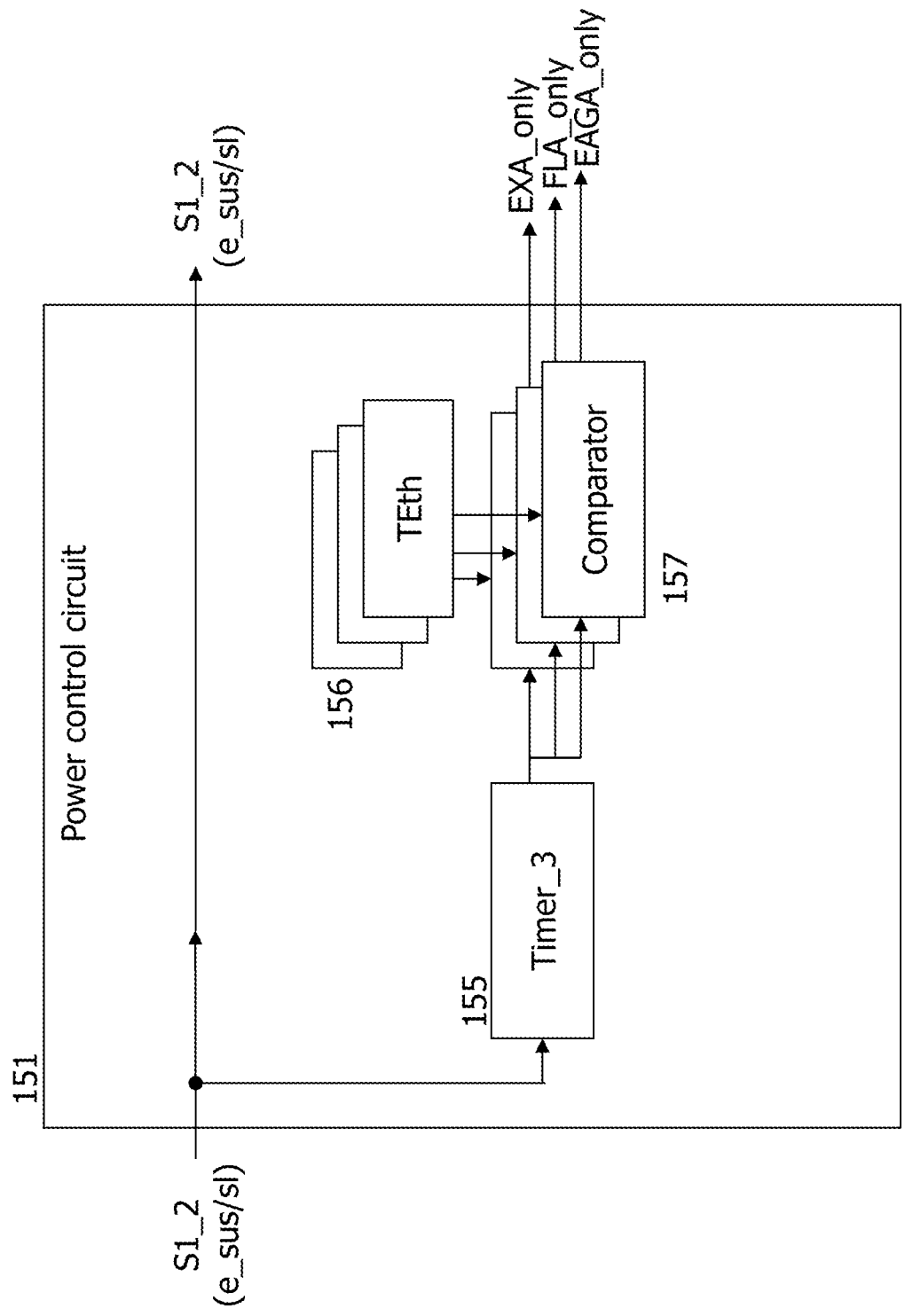
FIG. 26 is a diagram illustrating a configuration example of the power control circuit in the fifth embodiment.

FIG. 26 is a diagram illustrating a configuration example of the power control circuit in the fifth embodiment. The power control circuit 15 of FIG. 22 illustrates the control circuit upon a transition to the instruction processing stopped state corresponding to the instruction processing stop signal S1_1. In contrast, the power control circuit 15 of FIG. 26 illustrates the control circuit upon a termination of the instruction processing stopped state corresponding to the stop termination signal S1_2.

In FIG. 26, the power control circuit 15 transfers the stop termination signal S1_2 to the monitoring circuit 13. Further, the power control circuit 15 includes a timer 155 that measures a time from when the stop termination signal S1_2 has changed to H, three threshold time registers 156 that configure second threshold times TEth1 to TEth3 that are times at which the internal circuits transition to the clock enabled state in order, and three comparators 157 that respectively compare the time of the timer 155 and the three threshold times TEth1 to TEth3. The second threshold times TEth1 to TEth3 are respectively configured to times t21, t22, t23 such that t21<t22<t23.

Figure 27:
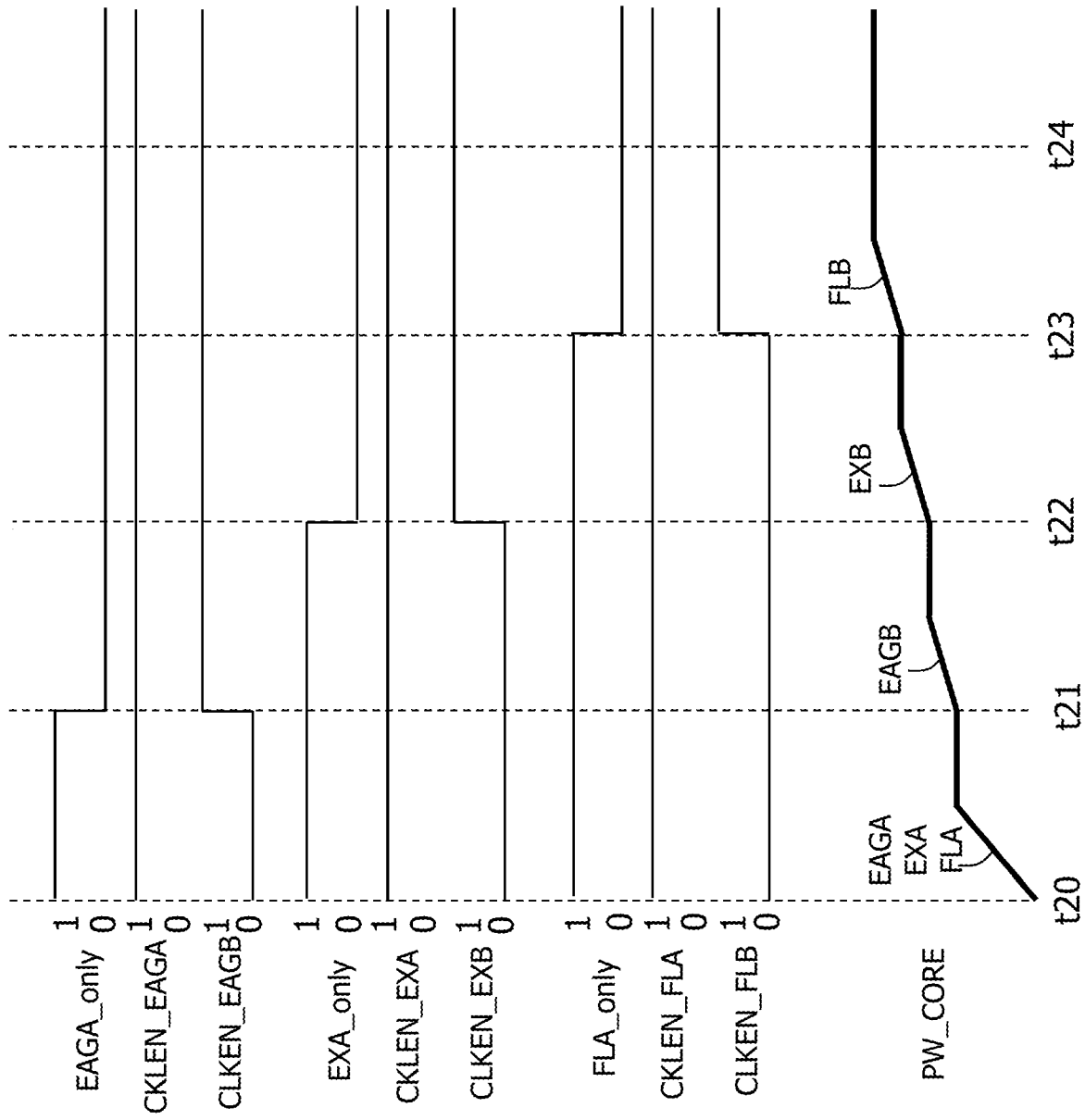
FIG. 27 is a timing diagram illustrating the operation of the power control circuit of FIG. 26.

FIG. 27 is a timing diagram illustrating the operation of the power control circuit of FIG. 26. At time t20, the core in the stopped state returns to the instruction processing state. At this time, when the time of the timer 155 exceeds the respective second threshold times TEth1 to TEth3 (which equal t21, t22, and t23), the three comparators 157 changes a control signal EAGA_only that restricts use to only one arithmetic element EAGA of the arithmetic element 114 of FIG. 11, a signal EXA_only that controls only one arithmetic element EXA of the arithmetic element 115 to the clock enabled state, and a signal FLA_only that controls only one arithmetic element FLA of the arithmetic element 116 to the clock enabled state, from H level (to control only one to the clock enabled state) to L level (to control both to the clock enabled state) in order.

Thus, since the signal EAGA_only is at H level at time t20, only EAGA out of the arithmetic elements EAGA and EAGB is controlled to the clock enabled state (CLKEN_EAGA=H), and EAGB to the clock disabled state (CLKEN_EAGB=L), so that only the arithmetic element EAGA is set to the clock supplied state. In a same manner, since the signal EXA_only is at H level, only EXA out of the arithmetic elements EXA and EXB is controlled to the clock enabled state (CLKEN_EM=H), and EXB to the clock disabled state (CLKEN_EXB=L), so that only the arithmetic element EXA is set to the clock supplied state. Further, since the signal FLA_only is at H level, only FLA out of the arithmetic elements FLA and FLB is controlled to the clock enabled state (CLKEN_FLA=H), and FLB to the clock disabled state (CLKEN_FLB=L), so that only the arithmetic element FLA is set to the clock supplied state. As a result, at time t20, the power consumption PW_CORE of the core rises by the amount of power consumption of the arithmetic elements EAGA, EXA, and FLA.

Next, at time t21, the first comparator 157 changes the signal EAGA_only from H level to L level. Accordingly, the arithmetic element EAGB is newly controlled to the clock enabled state (CLKEN_EAGB=H), and the power consumption PW_CORE of the core rises at time t21 by the amount of power consumption of the arithmetic element EAGB.

Next, at time t22, the second comparator 157 changes the signal EXA_only from H level to L level. Accordingly, the arithmetic element EXB is newly controlled to the clock enabled state (CLKEN_EXB=H), and the power consumption PW_CORE of the core rises at time t22 by the amount of power consumption of the arithmetic element EXB.

Finally, at time t23, the third comparator 157 changes the signal FLA_only from H level to L level. Accordingly, the arithmetic element FLB is newly controlled to the clock enabled state (CLKEN_FLB=H), and the power consumption PW_CORE of the core rises at time t23 by the amount of power consumption of the arithmetic element FLB.

When one core returns to the instruction processing state, with the control of FIG. 27, the power consumption of the one core rises gradually in four stages. Also when the plurality of cores concurrently return to the instruction processing state, the power consumption of the plurality of cores rises gradually in four stages.

Returning to FIG. 25, the four cores CORE1 to CORE4 return to the instruction processing state at the same time at time t5. However, as described with FIG. 27, the three arithmetic elements of each core are such that only one arithmetic element is set to the clock enabled state at first, and then the other arithmetic element is set to the clock enabled state in order. Thus, as illustrated in FIG. 25, the power consumption of the processor returns to the original power level in four stages from time t5.

As described above, in the case where the plurality of cores have returned to the instruction processing state from the instruction processing stopped state at the same time or in a short period of time, the processor in this embodiment moderates the degree of variation in power of the whole to within the acceptable power difference P_dPW and moderates the power supply noise to within an acceptable value. In a same manner, in the case where the plurality of cores have transitioned to the instruction processing stopped state from the instruction processing state at the same time or in a short period of time, the processor moderates the degree of variation in power of the whole to within the acceptable power difference P_dPW and moderates the power supply noise to within the acceptable value.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:
a plurality of arithmetic processing units each including,
a plurality of internal circuits each of which, in an instruction processing state in which an instruction is processed, processes the instruction in a first operation state and that, in an instruction processing stopped state in which instruction processing is stopped, transitions to a power save operation in a power save operation state; and
a power control circuit that disables the power save operation to control into a power save disable state; and
a monitoring circuit that monitors the instruction processing stopped state of the plurality of arithmetic processing units and includes:
a counter that counts a number of the arithmetic processing units in the instruction processing stopped state,
a plurality of threshold registers storing a plurality of thresholds respectively, and
a plurality of comparators each of which compares a count value of the counter and each of the plurality of thresholds and output a plurality of control signals corresponding to each of the plurality of thresholds, in a case where the count value exceeds each of the plurality of thresholds, the power control circuit of each of the plurality of arithmetic processing units, in the instruction processing stopped state before a stop termination signal for terminating the instruction processing stopped state is generated,
disables the power save operation of first internal circuits of the plurality of internal circuits, a number of which corresponds to the number of the arithmetic processing units in the instruction processing stopped state, in accordance with the plurality of the control signals to control into the power save disable state, when triggered by a state where the number of the arithmetic processing units in the instruction processing stopped state exceeds a threshold, and
controls the arithmetic processing unit in the instruction processing stopped state to the power save operation state while the number of the arithmetic processing units in the instruction processing stopped state does not exceed the threshold, and the power control circuit of each of the plurality of arithmetic processing units, when the arithmetic processing unit in the instruction processing stopped state returns to the instruction processing state in response to the stop termination signal being generated,
transitions the arithmetic processing unit in the instruction processing stopped state and the power save disable state from the power save disable state to the first operation state in a case where the number of the arithmetic processing units in the instruction processing stopped state exceeds the threshold, and
transitions the arithmetic processing unit in the instruction processing stopped state and the power save operation state from the power save operation state to the first operation state in a case where the number of the arithmetic processing units in the instruction processing stopped state does not exceed the threshold.

2. The arithmetic processing device according to claim 1, wherein
the arithmetic processing unit includes a clock gate that supplies a clock to the internal circuit and stops supplying the clock,
the internal circuit of each of the plurality of arithmetic processing units controls the clock gate to a clock supplied state in the instruction processing state of the arithmetic processing unit and controls the clock gate to a clock supply stopped state to transition to the power save operation state in the instruction processing stopped state of the arithmetic processing unit, and
the power control circuit of each of the plurality of arithmetic processing units controls the clock gate to the clock supplied state in the instruction processing stopped state to disable the power save operation.

3. The arithmetic processing device according to claim 1, wherein the power control circuit of each of the plurality of arithmetic processing units executes disabling of the power save operation, such that a total of an amount of power saving when the power save operation of the plurality of arithmetic processing units in the instruction processing stopped state has been disabled becomes less than or equal to a returning acceptable power difference,
wherein the returning acceptable power difference is an acceptable power difference when all of the plurality of arithmetic processing units in the instruction processing stopped state returning to the instruction processing state from the instruction processing stopped state within a predetermined short term.

4. The arithmetic processing device according to claim 1, wherein the power control circuit of each of the plurality of arithmetic processing units executes disabling of the power save operation, such that a total of an amount of power saving when the power save operation of the plurality of arithmetic processing units in the instruction processing stopped state has been disabled becomes less than or equal to a stopping acceptable power difference,
wherein the stopping acceptable power difference is an acceptable power difference when all of the plurality of arithmetic processing units in the instruction processing state transitioning to the instruction processing stopped state from the instruction processing state within a predetermined short term.

5. The arithmetic processing device according to claim 1, wherein
the monitoring circuit includes a counter that holds a count value obtained by counting the number of the arithmetic processing units in the instruction processing stopped state, a threshold register, and a comparator that compares the count value of the counter and the threshold and outputs control information when the count value exceeds the threshold, and
the power control circuit of each of the plurality of arithmetic processing units disables the power save operation of the arithmetic processing unit in the instruction processing stopped state in response to the control information.

6. The arithmetic processing device according to claim 1, wherein
the monitoring circuit includes a counter that holds a count value obtained by counting the number of the arithmetic processing units in the instruction processing stopped state, and
the power control circuit of each of the plurality of arithmetic processing units includes a threshold register and a comparator that compares the count value of the counter and the threshold and outputs control information when the count value exceeds the threshold, and moreover the power control circuit of each of the plurality of arithmetic processing units disables the power save operation of the arithmetic processing unit in the instruction processing stopped state in response to the control information.

7. The arithmetic processing device according to claim 1, wherein, in a case where the plurality of arithmetic processing units in the instruction processing state make a transition to the instruction processing stopped state,
the monitoring circuit sets the threshold to a first value and changes the threshold to a second value greater than the first value after a first predetermined time has passed since the transition, and
the power save operation of the plurality of arithmetic processing units transitioning to the instruction processing stopped state is disabled for the first predetermined time, and then the power save operation is enabled after the first predetermined time.

8. The arithmetic processing device according to claim 7, wherein, in a case where the arithmetic processing unit in the instruction processing stopped state returns to the instruction processing state,
the monitoring circuit changes the threshold from a third value to a fourth value less than the third value at a second predetermined time before the return, and the power save operation of the plurality of arithmetic processing units transitioning to the instruction processing state is set to a disabled state from an enabled state at the second predetermined time before implementing the return, and is disabled until the return.

9. An arithmetic processing device comprising:
a plurality of arithmetic processing units each including,
a plurality of internal circuit each of which, in an instruction processing state in which an instruction is processed, processes the instruction in a first operation state and that, in an instruction processing stopped state in which instruction processing is stopped, transitions to a power save operation in a power save operation state, and
a power control circuit that disables the power save operation to control into a power save disable state; and
a monitoring circuit that monitors the instruction processing stopped state of the plurality of arithmetic processing units and includes a counter that counts a number of the arithmetic processing units in the instruction processing stopped state,
the power control circuit of each of the plurality of arithmetic processing units includes
a plurality of threshold registers storing a plurality of thresholds respectively, and
a plurality of comparators that compare the count value of the counter and each of the plurality of thresholds and output a plurality of control signals corresponding to each threshold, in a case where the count value exceeds each of the plurality of thresholds; and
the power control circuit of each of the plurality of arithmetic processing units, in the instruction processing stopped state before a stop termination signal for terminating the instruction processing stopped state is generated,
disables the power save operation of first internal circuits of the plurality of internal circuits, a number of which corresponds to the number of the arithmetic processing units in the instruction processing stopped state, in accordance with a plurality of the control signals to control into the power save disable state, when triggered by a state where the number of the arithmetic processing units in the instruction processing stopped state exceeds a threshold, and
controls the arithmetic processing unit in the instruction processing stopped state to the power save operation state while the number of the arithmetic processing units in the instruction processing stopped state does not exceed the threshold, and
the power control circuit of each of the plurality of arithmetic processing units, when the arithmetic processing unit in the instruction processing stopped state returns to the instruction processing state in response to the stop termination signal being generated,
transitions the arithmetic processing unit in the instruction processing stopped state and the power save disable state from the power save disable state to the first operation state in a case where the number of the arithmetic processing units in the instruction processing stopped state exceeds the threshold, and
transitions the arithmetic processing unit in the instruction processing stopped state and the power save operation state from the power save operation state to the first operation state in a case where the number of the arithmetic processing units in the instruction processing stopped state does not exceed the threshold.

10. The arithmetic processing device according to claim 1, wherein the power control circuit of each of the plurality of arithmetic processing units controls, in a case of disabling the power save operation of the arithmetic processing unit in the instruction processing stopped state, the power save operation of a second internal circuit other than the first internal circuit out of the plurality of internal circuits to be in an enabled state from a disabled state in order.

11. The arithmetic processing device according to claim 1, wherein
the plurality of internal circuits includes a plurality of arithmetic processing circuits,
the plurality of arithmetic processing circuits each include a plurality of sets of circuits, and
in a case of returning the arithmetic processing unit in the instruction processing stopped state to the instruction processing state, the power control circuit of each of the plurality of arithmetic processing units controls, to be a non-power save operation, a set of circuits that is a part of the plurality of sets of circuits within the plurality of arithmetic processing circuits of the arithmetic processing unit to be returned, and then controls a remaining set of circuits out of the plurality of sets of circuits of the plurality of arithmetic processing circuits to be in the non-power save operation in order.

12. The arithmetic processing device according to claim 10, wherein
the plurality of internal circuits includes a plurality of arithmetic processing circuits,
the plurality of arithmetic processing circuits each include a plurality of sets of circuits, and
in a case of returning the arithmetic processing unit in the instruction processing stopped state to the instruction processing state, the power control circuit of each of the plurality of arithmetic processing units controls, to be a non-power save operation, a set of circuits that is a part of the plurality of sets of circuits within the plurality of arithmetic processing circuits of the arithmetic processing unit to be returned, and then controls a remaining set of circuits out of the plurality of sets of circuits of the plurality of arithmetic processing circuits to be in the non-power save operation in order.

13. A method of controlling an arithmetic processing device, the method comprising:
the arithmetic processing device including a plurality of arithmetic processing units each including a plurality of internal circuits each of which, in an instruction processing state in which an instruction is processed, processes the instruction in a first operation state and that, in an instruction processing stopped state in which instruction processing is stopped, transitions to a power save operation in a power save operation state,
by a counter included in a monitoring circuit included in the arithmetic processing device, counting a number of the arithmetic processing units in the instruction processing stopped state;
by a plurality of comparators included in the monitoring circuit, comparing a count value of the counter and each of a plurality of thresholds and output a plurality of control signals corresponding to each of the plurality of threshold, in a case where the count value exceeds each of the plurality of thresholds; and
by a power control circuit included in each of the plurality of arithmetic processing units, in the instruction processing stopped state before a stop termination signal for terminating the instruction processing stopped state is generated, disabling the power save operation of first internal circuits of the plurality of internal circuits, a number of which corresponds to the number of the arithmetic processing units in the instruction processing stopped state, in accordance with the plurality of the control signals to control into a power save disable state, when triggered by a state where the number of the arithmetic processing units in the instruction processing stopped state exceeds a threshold, and controlling the arithmetic processing unit in the instruction processing stopped state to the power save operation state while the number of the arithmetic processing units in the instruction processing stopped state does not exceed the threshold, and by the power control circuit of each of the plurality of arithmetic processing units, when the arithmetic processing unit in the instruction processing stopped state returns to the instruction processing state in response to the stop termination signal being generated, transitioning the arithmetic processing unit in the instruction processing stopped state and the power save disable state from the power save disable state to the first operation state in a case where the number of the arithmetic processing units in the instruction processing stopped state exceeds the threshold, and transitioning the arithmetic processing unit in the instruction processing stopped state and the power save operation state from the power save operation state to the first operation state in a case where the number of the arithmetic processing units in the instruction processing stopped state does not exceed the threshold.

* * * * *